US008566758B2

(12) United States Patent
Moriyama

(10) Patent No.: US 8,566,758 B2
(45) Date of Patent: Oct. 22, 2013

(54) DATA DEPENDENCY MANAGING APPARATUS, DESIGN DATA DEPENDENCY MANAGING METHOD AND PROGRAM

(75) Inventor: Osamu Moriyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 994 days.

(21) Appl. No.: 11/844,756

(22) Filed: Aug. 24, 2007

(65) Prior Publication Data

US 2008/0104565 A1  May 1, 2008

(30) Foreign Application Priority Data

Oct. 27, 2006  (JP) .................................. 2006-291868

(51) Int. Cl.
*G06F 17/50* (2006.01)

(52) U.S. Cl.
USPC ........... 716/100; 716/101; 716/102; 716/103; 716/104; 716/110; 716/111

(58) Field of Classification Search
USPC .................... 716/1, 100–104, 110–111; 707/8
See application file for complete search history.

(56) References Cited

U.S. PATENT DOCUMENTS

| 5,517,421 | A | * | 5/1996 | Jimbo et al. ................... 716/103 |
| 5,826,265 | A | * | 10/1998 | Van Huben et al. ............... 707/8 |
| 5,920,867 | A | * | 7/1999 | Van Huben et al. .......... 707/101 |
| 6,035,297 | A | * | 3/2000 | Van Huben et al. ............... 707/8 |
| 6,088,693 | A | * | 7/2000 | Van Huben et al. ............... 707/8 |
| 6,094,654 | A | * | 7/2000 | Van Huben et al. ............... 707/8 |
| 6,574,788 | B1 | * | 6/2003 | Levine et al. .................. 716/102 |
| 7,146,586 | B2 | * | 12/2006 | Bohl et al. ..................... 716/136 |
| 7,805,690 | B2 | * | 9/2010 | Willis ........................... 716/103 |
| 2002/0059553 | A1 | * | 5/2002 | Eng .................................... 716/4 |
| 2006/0101368 | A1 | * | 5/2006 | Kesarwani et al. ............. 716/11 |

FOREIGN PATENT DOCUMENTS

| JP | 6-268066 | 9/1994 |
| JP | 7-182404 | 7/1995 |
| JP | 8-96018 | 4/1996 |
| JP | 10-97562 | 4/1998 |
| JP | 2004-280811 | 10/2004 |

OTHER PUBLICATIONS

Communication mailed from the Japanese Patent Office on Sep. 13, 2011 in the related Japanese patent application No. 2006-291868.
Communication mailed from the Japanese Patent Office on May 29, 2012 in the related Japanese patent application No. 2006-291868.

* cited by examiner

*Primary Examiner* — Nghia Doan
(74) *Attorney, Agent, or Firm* — Staas & Halsey LLP

(57) ABSTRACT

A design data dependency managing apparatus comprises an input/output data storing unit for storing design input/output dependency information indicating a dependency between design input/output data, which becomes an input/output of a design, and other design input/output data in association with the design input/output data, and a design execution environment constructing unit for generating design data dependency information indicating a version number, on which a dependency is made, of the design input/output data required for the design by using the design input/output dependency information, and for constructing a design execution environment.

22 Claims, 17 Drawing Sheets

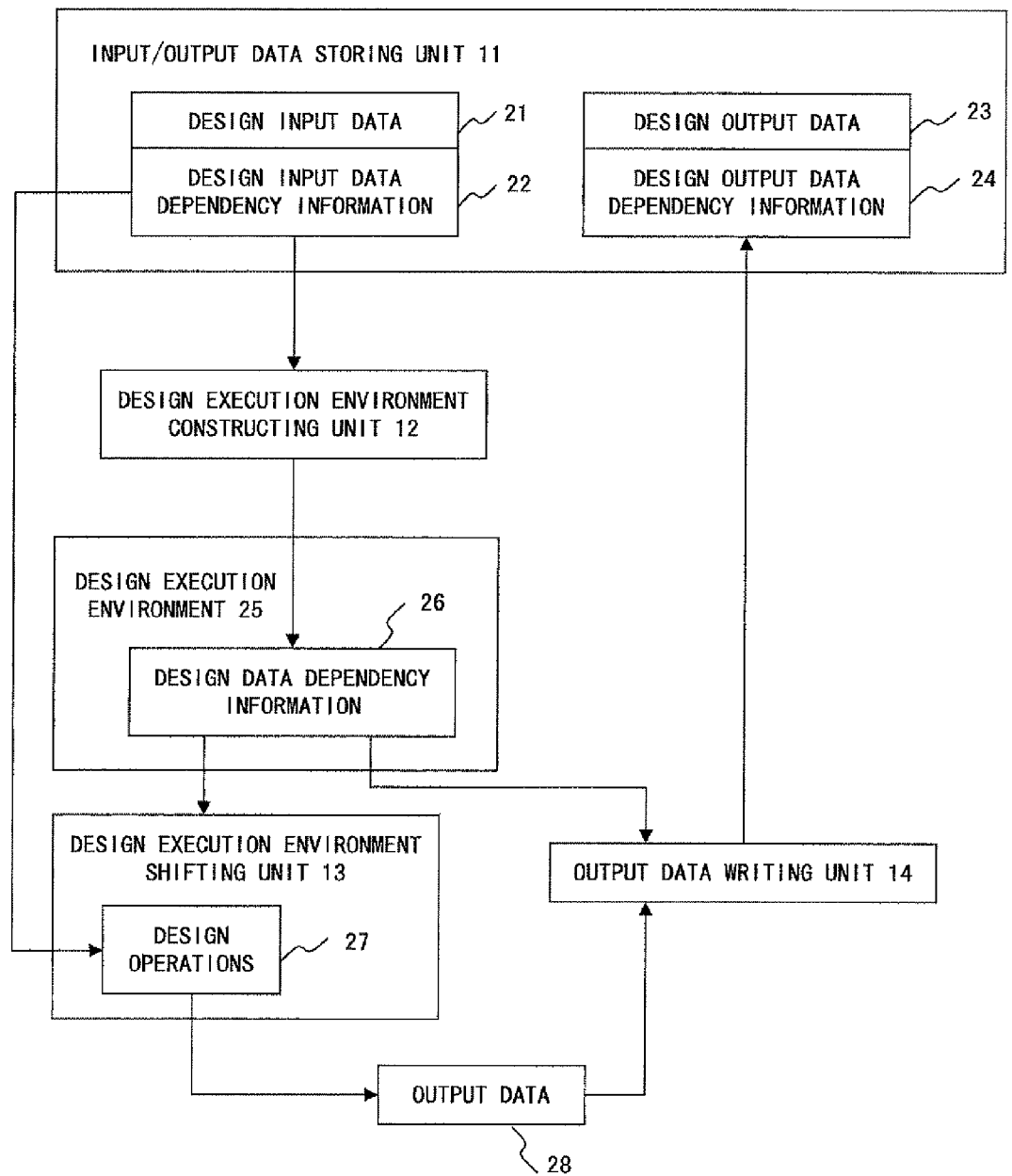
F I G. 1

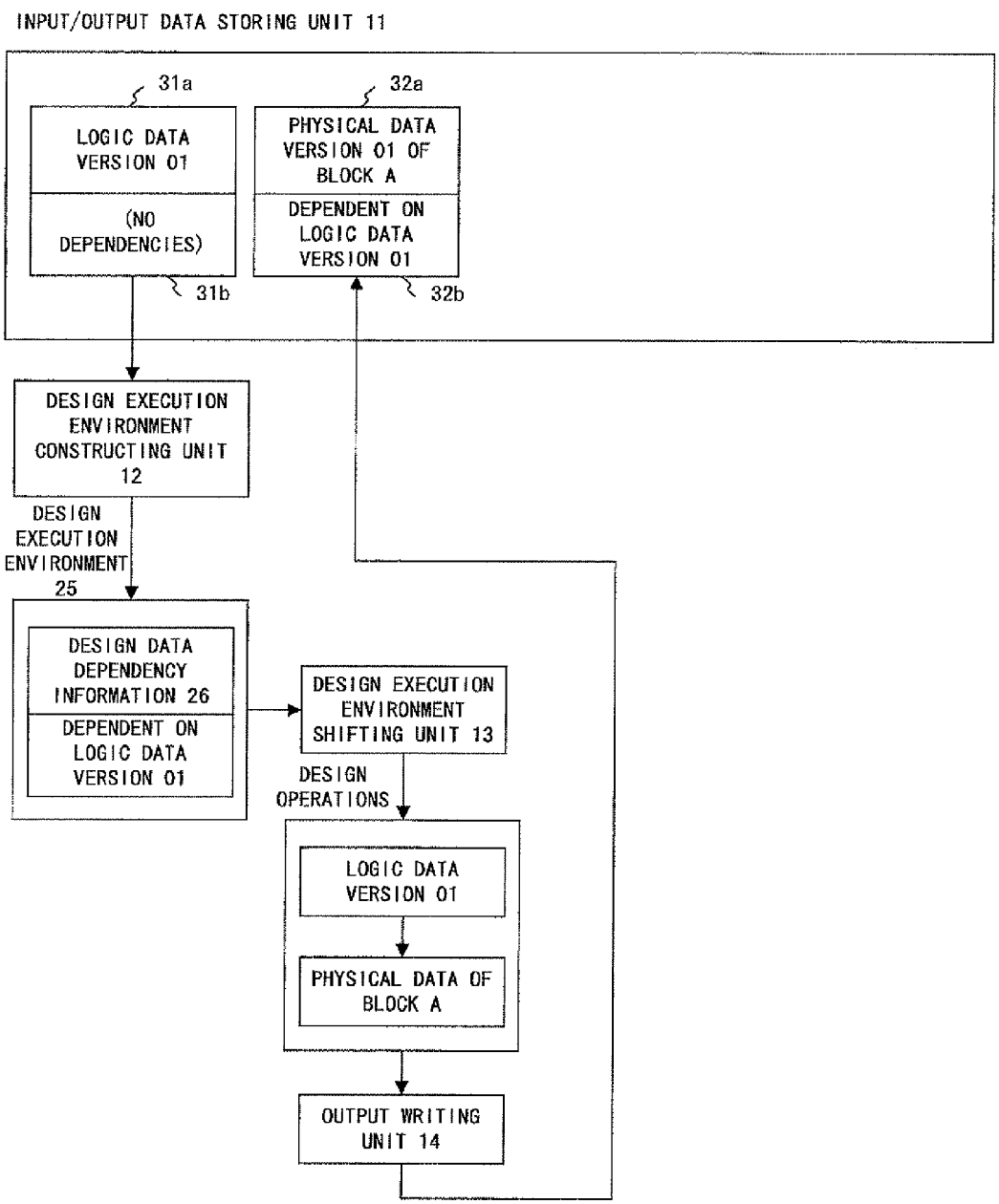
F I G. 5

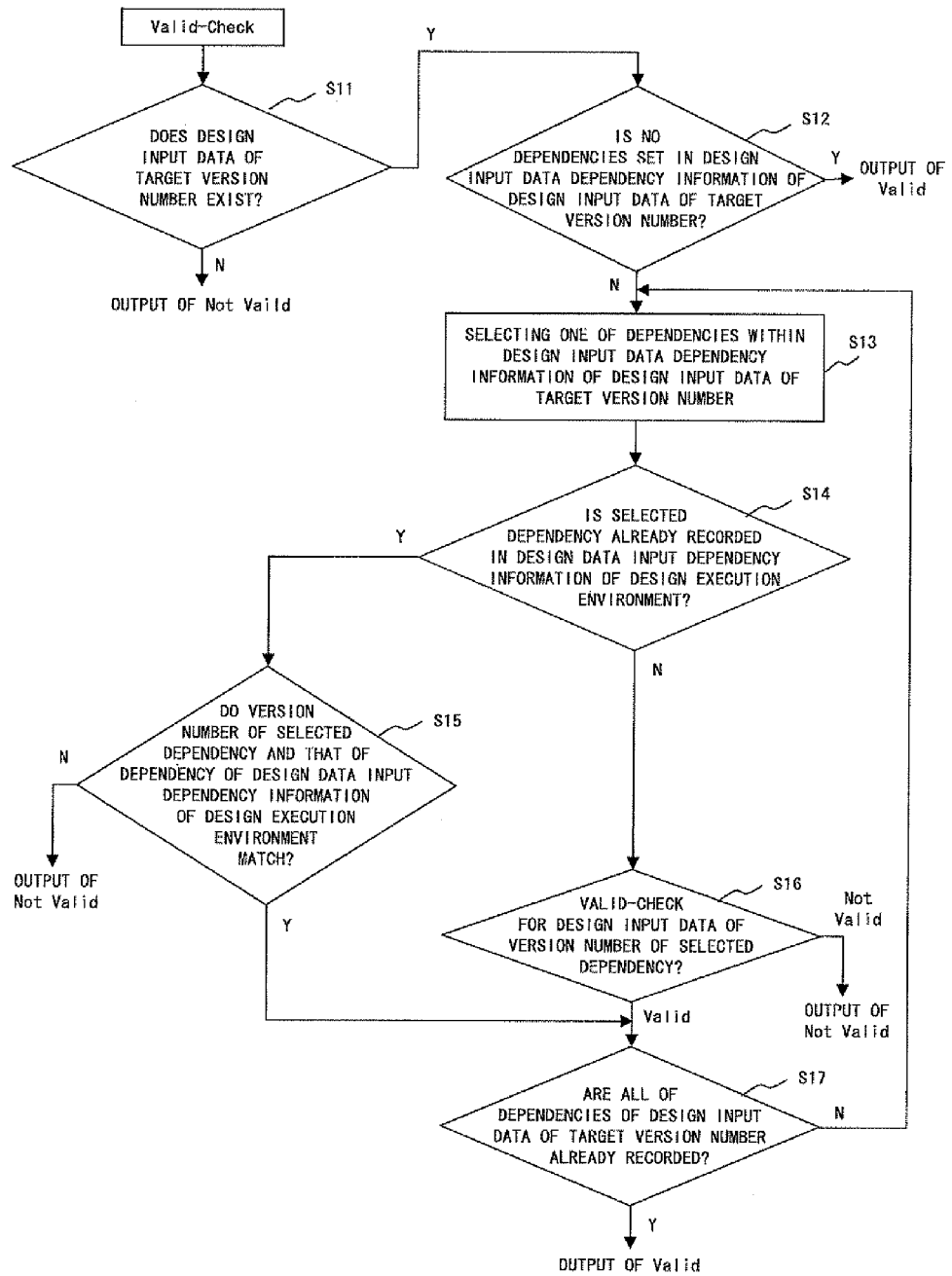
F I G. 12

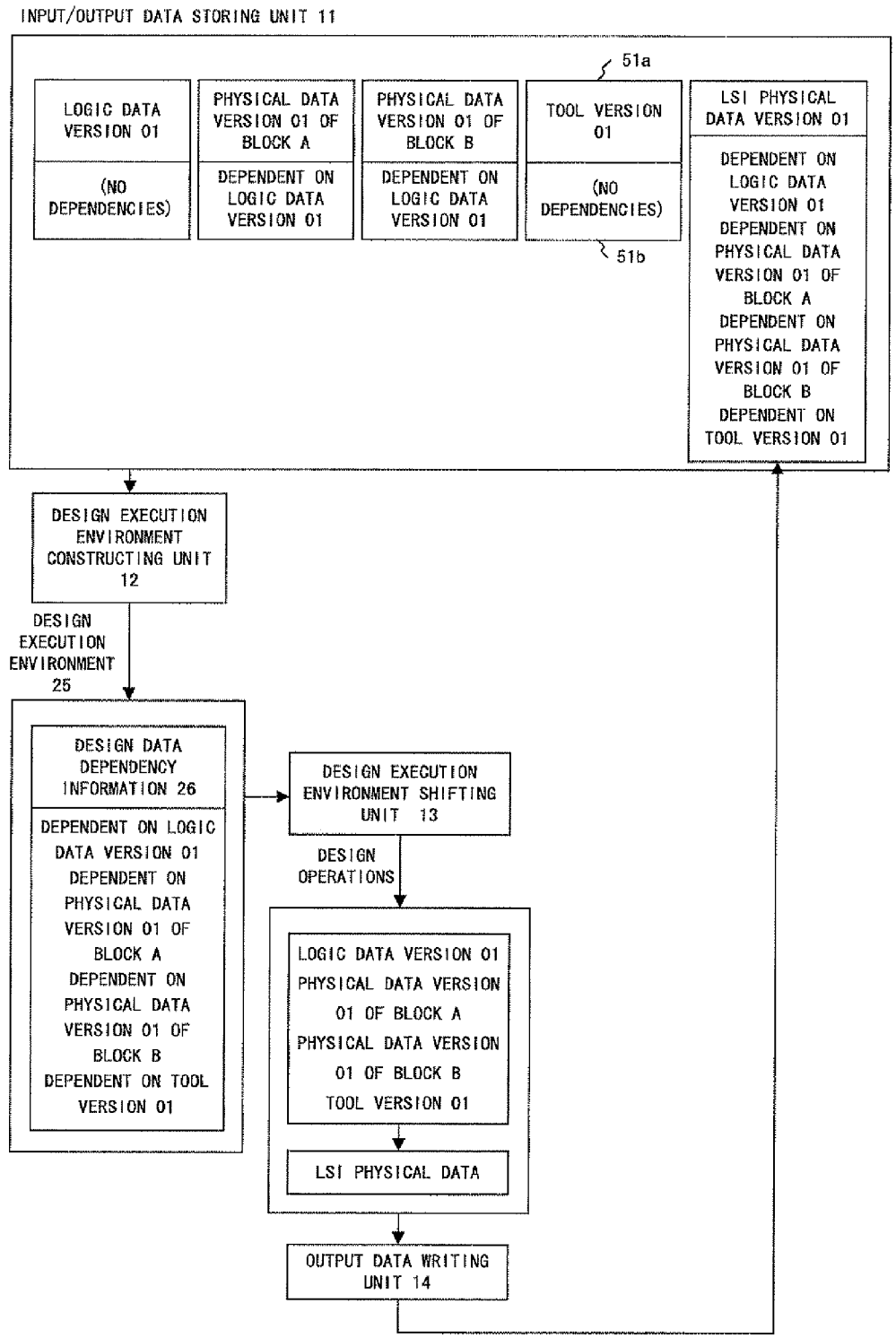
F I G. 14

DATA DEPENDENCY MANAGING APPARATUS, DESIGN DATA DEPENDENCY MANAGING METHOD AND PROGRAM

BACKGROUND OF THE INVENTION

1. Field of the Invention

The present invention relates to a design technique for a semiconductor device, and more particularly, to the management of dependencies of design input data, etc. used by a CAD when a design is partitioned and made by a plurality of designers.

2. Description of the Related Art

With an increase in the scale of an object to be designed, the number of cases where a design is shared and made by a plurality of designers has been growing. Additionally, to implement a parallel processing executed by a plurality of designers, a consistency must be maintained in processes, and a variety of proposals for maintaining a consistency have been therefore made.

For example, according to Patent Document 1 (Japanese Published Unexamined Patent Application No. H8-96018), a design execution environment for guaranteeing a consistency in tools is implemented by storing the execution dependencies of a CAD tool.

Additionally, according to Patent Document 2 (Japanese Published Unexamined Patent Application No. H10-97562), an optimum execution order can be automatically determined without causing a designer to make a judgment or perform an operation. With this technique, read association information is generated from the record of accesses, which are made to a database by an application program, dependencies among application programs are generated from the read association information, and the execution order of the application programs is determined from the dependencies.

Furthermore, Patent Document 3 (Japanese Published Unexamined Patent Application No. H7-182404) discloses a configuration where a dependency of each tool used for a design is stored, and each tool is executed based on the dependency.

If a plurality of designers share and make a design, version numbers must be synchronized for design data respectively generated by the designers in some cases.

Conventionally, a designer who executes a design process later must closely contact designers who already started to execute the process regarding design data to be used, and must correctly collect the design data.

One of conventional methods for correctly collecting design data includes a centralized design data storing method for gathering only the latest design data in a predetermined place.

With this method, since a user of design data references only the data gathered in one place, an error such as a misuse of data of an incorrect version number is difficult to occur.

However, once the user starts the process of one version number, he or she cannot start design operations using the design data of the next version number until the entire process for the current version number is complete.

As another method, there is a distributed design data storing method for gathering design data for each version number based on the version number of the most basic design data.

With this method, a designer selects design data gathered for each version number.

However, it is inefficient that each designer has the whole of his or her required data for each version number. This is because different versions use the design data of a common version number of the basic design data in many cases.

Accordingly, it is quite inefficient from the viewpoint of memory resources to hold the copy of design data managed independently by version number in a design data storage location provided for each version number.

Furthermore, a method for managing design data for each version number in units of independent design data managed by version number is considered.

In this case, many pieces of distributed design data are managed depending on the number of pieces of independent design data. Besides, the design data managed independently by version number mutually have a dependency in many cases. A designer must remember this dependency, and must select and input consistent design data correctly. This operation becomes a burden for the designer, leading to one factor to cause an error.

Additionally, a CAD tool used at the time of a design can be considered as one of pieces of design data managed independently by version number. However, there are also cases where synchronization must be taken between the version number of a tool and that of data, or between the version numbers of tools. In this case, a designer must closely contact a designer of a CAD tool, and must use the tool correctly.

Furthermore, as a problem of a tool, which can be possibly caused by a design operation environment unique to each designer, there is a case where an execution error is caused by a different symptom although designers use the same tool. In this case, there are no problems if a tool designer considers the individual environments of diverse users. Actually, however, it is difficult to create the tool in consideration of all of cases of many users.

SUMMARY OF THE INVENTION

An object of the present invention is to provide a design data dependency managing apparatus for efficiently managing the version number of design data, which becomes an input, or that of a design tool, and for constructing a design environment unified for designers, if an LSI is partitioned and a hierarchical design is made, or if a design is shared and made by a plurality of designers, in a series of operations for designing a large-scale LSI.

To achieve the above described object, the design data dependency managing apparatus according to the present invention comprises an input/output data storing unit, and a design execution environment constructing unit.

The input/output data storing unit stores design input/output dependency information that indicates a dependency between design input/output data, which becomes an input/output of a design, and other design input/output data in association with the design input/output data.

The design execution environment constructing unit generates design data dependency information indicating a version number, on which a dependency is made, of the design input/output data required for a design by using the design input/output dependency information, and constructs a design execution environment.

With this configuration, a designer never uses inconsistent design input/output data in a design execution environment.

Additionally, the design data dependency managing apparatus may further comprise a design execution environment shifting unit for setting an input data path to the design input/output data of a version number having a dependency indicated in the design data dependency information.

With this configuration, for example, in the design execution environment, the design input/output data required for a design is referenced by using the input data path, thereby increasing the efficiency of memory or disk resources.

Additionally, the design execution environment shifting unit may be configured to check whether or not the input/output data of a version number, the input data path of which is to be set, is stored in the input/output data storing unit, before setting the input data path.

With this configuration, design input/output data of an old version number, which disappears due to a deletion, etc., can be checked before a design is made.

Furthermore, the design execution environment constructing unit can be configured to record, as a dependency, the latest version numbers of all of pieces of the design input/output data, which are required when a design process is executed, in the design data dependency information within a range where the dependency is consistent.

With this configuration, a design can be made by using the latest data within the consistent range.

The design execution environment constructing unit can include fixed design execution environment information in the design data dependency information, and can provide a unified design environment to designers.

Furthermore, the design data dependency managing apparatus may be configured to further comprise an output data writing unit for storing dependency information generated based on the design data dependency information in the design execution environment in correspondence with results of a design made by a designer.

With this configuration, design input/output data dependency information is added also to the results of a design, whereby the results can be used as new design input/output data.

Additionally, the design input/output data can be configured to include a tool.

Furthermore, the design input/output data can be configured to include a timing cell library, and a physical cell library.

With this configuration, also a tool and a cell library can be used with a consistent dependency similar to other design input/output data.

Additionally, the present invention covers also a design data dependency managing method and storage medium in its scope.

According to the present invention, a designer is prevented from obtaining inconsistent data in a design execution environment even if he or she is unconscious, whereby the efficiency of the designer can be increased.

Furthermore, a unified environment can be provided to designers, thereby increasing the efficiency of supporting the designers.

Still further, once an environment is constructed, influences are not exerted even if input data is updated, and a process can be continued. Therefore, the process can be executed in parallel for a plurality of data version numbers, and the efficiency of the design can be increased.

Still further, since a plurality of identical environments can be constructed, the same design can be made simultaneously. As a result, design operations that use the same input data and different parameters can be correctly executed at the same time.

Still further, once an environment is constructed, influences are not exerted even if input data is updated. As a result, a designer who started a design earlier does not need to be particularly conscious of, for example, synchronization with a designer who starts the design later. Therefore, the number of errors is reduced, which leads to an increase in the efficiency.

BRIEF DESCRIPTION OF THE DRAWINGS

FIG. 1 shows the concept of a design data dependency managing apparatus according to a preferred embodiment;

FIG. 5 shows a case where a physical design of a block A is made from a logic data version 01, and its results are stored as output data;

FIG. 12 is a flowchart showing the details of a Valid-Check process;

FIG. 14 shows a process executed when an LSI physical design is made in a state where LSI physical data is dependent on logic data, block physical data, and a tool:

DESCRIPTION OF THE PREFERRED EMBODIMENTS

Figure 2:
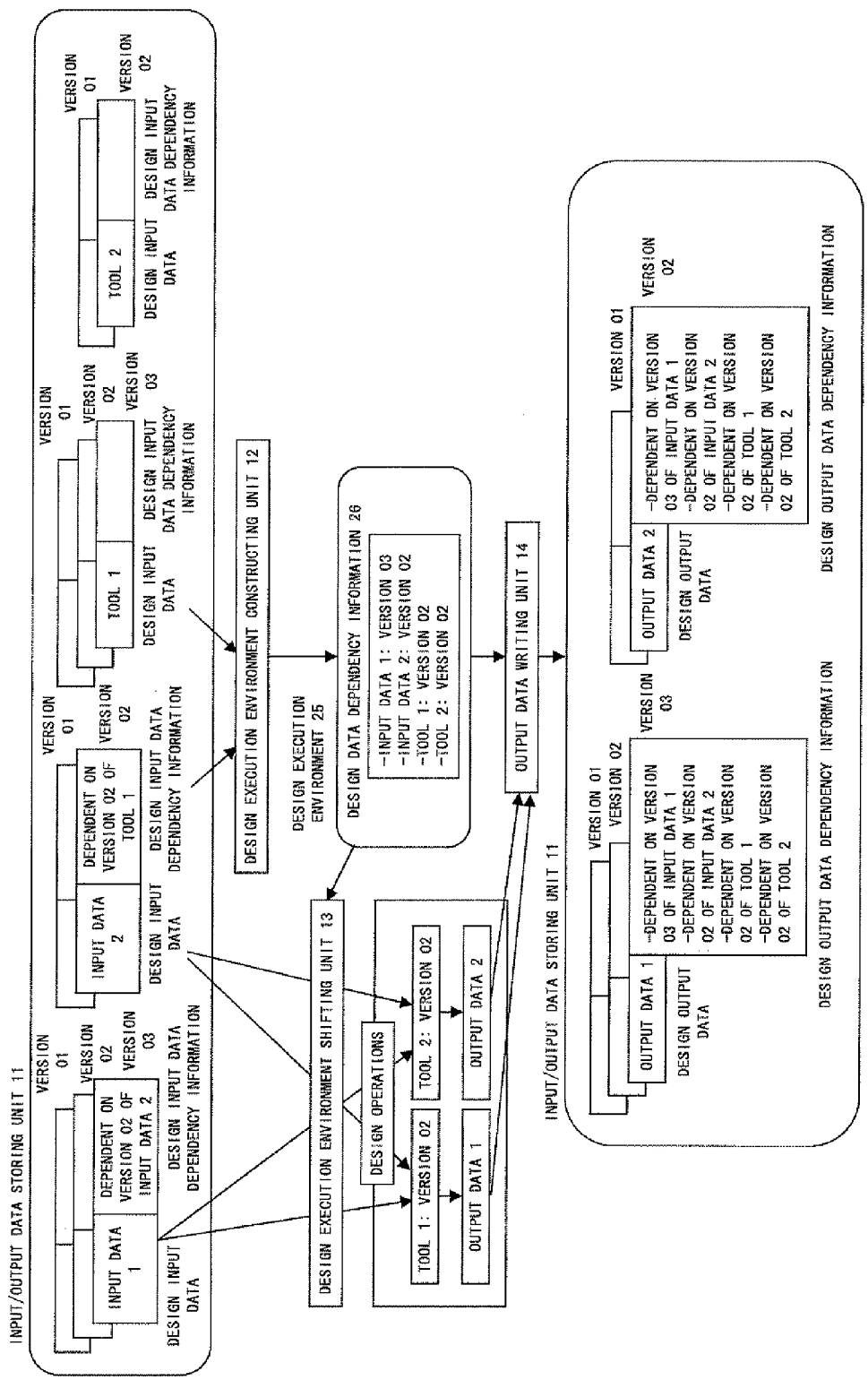
FIG. 2 more specifically shows data handled by the design data dependency managing apparatus according to the preferred embodiment.

FIG. 1 shows the concept of a design data dependency managing apparatus according to a preferred embodiment.

The design data dependency managing apparatus according to this preferred embodiment comprises an input/output data storing unit 11, a design execution environment constructing unit 12, a design execution environment shifting unit 13, and an output data writing unit 14.

In the design data dependency managing apparatus according to this preferred embodiment, each design input data 21, which is held by the input/output data storing unit 11, is provided with design input data dependency information 22 indicating on which other data each design input data 21 is dependent. As a result, corresponding design input data dependency information 22 is referenced when certain design input data 21 of a certain version number is used, whereby the version number of other design input data 21, which must be used along with the design input data 21, is proved.

By using the design input data dependency information 22, the design execution environment constructing unit 12 constructs a design execution environment 25. The design execution environment constructing unit 12 determines the version numbers to be referenced of all of pieces of the design input data 21, which are required when a design process is executed, and holds the results as design data dependency information 26 in the constructed design execution environment 25. When the design process is executed, the design execution environment shifting unit 13 sets an input data path to the design input data 21 of a corresponding version number based on the design data dependency information 26 in order to allow required design input data 21 to be referenced from the design execution environment 25. Therefore, an inconsistency in the version numbers of the design input data 21 does not occur when a designer makes a design in the design execution environment 25.

Additionally, since each input data is not accumulated but only referenced from the design execution environment 25, it is very efficient also from the viewpoint of memory or disk resources.

Note that the design input data 21 includes not only the logic data of a circuit used for an LSI physical design (specifically, place and route, etc.) but also a design tool and a cell library.

To validate the design data dependency information 26, which is generated by the design execution environment constructing unit 12, within the design execution environment 25, the design execution environment shifting unit 13 is used. As a result, design input data 21 of each version number based on the design data dependency information 26 can be referenced from the design execution environment 25, whereby a designer can perform design operations 27 by referencing his or her required design input data 21 the version numbers of which automatically maintain a consistency. As a result of the design operations 27 (a physical design in this case), design output data 28 is generated.

Furthermore, the design execution environment constructing unit 12 can additionally write continuously constant design execution environment information (such as parameters when a tool is used) to the design data dependency information 26 when generating the design data dependency information 26 within the design execution environment 25. The design execution environment shifting unit 13 sets a design environment by referencing the design execution environment information, whereby each designer who uses the design execution environment shifting unit 13 can perform design operations in a unified environment.

The design output data 28 is written to the input/output data storing unit 11 as the design output data 23 for the next operation using the design output data 28. The output data writing unit 14 governs this write process. The output data writing unit 14 also writes design output data dependency information 24, which corresponds to the design output data 23, simultaneously with the design output data 23. This design output data dependency information 24 is generated based on the design data dependency information 26 within the design execution environment 25. In the design data dependency information 26, the version number of design input data 21, on which corresponding design output data dependency information 24 is dependent, is recorded similar to the design input data dependency information 22.

Further details are described with reference to FIG. 2 where data handled by the design data dependency managing apparatus according to this preferred embodiment is made more specific.

In this figure, assume that versions 01 to 03 of input data 1, versions 01 and 02 of input data 02, versions 01 to 03 of a tool 1, and versions 01 and 02 of a tool 2 are stored as design input data along with their corresponding design input data dependency information in the input/output data storing unit 11. Also assume that a dependency the version 03 of the input data 1 on the version 02 of the input data 2 is recorded in the design input data dependency information of the version 03 of the input data 1, and a dependency the version 02 of the input data 2 on the version 02 of the tool 1 is recorded in the dependency information of the version 02 of the input data 2.

When an LSI physical design is made, the design execution environment constructing unit 12 initially generates design data dependency information 26, and then constructs a design execution environment 25. The design data dependency information 26 is generated to become the latest version number in a consistent range based on design input data dependency information corresponding to each design input data. In this figure, the design data dependency information 26 indicates that design input data, with which a design is made in this design execution environment 25, is dependent on the version 03 of the input data 1, the version 02 of the input data 2, the version 02 of the tool 1, and the version 02 of the tool 2.

The design execution environment shifting unit 13 sets input data paths, which respectively indicate the position of each input data and that of each tool in the input/output data storing unit 11, based on information indicated in the design data dependency information 26, and enables the data and the tools to be referenced. A designer can reference his or her required input data and tool in such a state while automatically maintaining a consistency in version numbers, and outputs results to the output data writing unit 14 as output data. The output data writing unit 14 writes this output data to the input/output data storing unit 11 along with design output data dependency information 24 generated from the design data dependency information 26.

In this way, in the design data dependency managing apparatus according to this preferred embodiment, each design input data and design output data are respectively recorded along with design input/output data dependency information indicating the version number of data or a tool, on which the corresponding input/output data is dependent.

Accordingly, a designer can make a design unconsciously by using data or a tool, the dependency of which maintains a consistency. Additionally, dependency information is added also to data resultant from a design, whereby a similar effect can be obtained also when a new design is made by using the data resultant from the design as input data.

Here, maintaining a consistency of dependencies means that each design input data is selected to make the version numbers of data, on which each design input data required for a design is dependent, match, and to prevent an inconsistency from occurring.

A specific implementation example is described next with reference to FIG. 3 by taking as an example a case where an LSI physical design is made.

In this example, input data to the design data dependency managing apparatus is the logic data of a partial circuit that configures an LSI.

Assume that the logic data is composed of three blocks A, B, and C, and the physical design, here, place and route (P&R) of each of the blocks, is made in this example. Upon termination of the physical designs (place and route) of the blocks, an LSI physical design is made by using respective results, and LSI physical verification for the entire LSI, such as timing verification, design rule check, etc. is made after the LSI physical design is terminated. Also assume that this logic design is in progress, the logic data is continuously updated, and new logic data is stored in the input/output data storing unit as the logic data of a new version number.

When a designer makes a logic design, and the logic data of a version 01 is generated, this logic data is stored in the input/output data storing unit 11 as design input data along with design input data dependency information as its dependency information. In this case, the logic data is stored without design dependency information because the dependency information does not exist.

After the logic data of the version 01 is stored in the input/output data storing unit 11, design execution environments 25 are respectively constructed by the design execution environment constructing unit 12 in the design data dependency managing apparatus in order to make the physical designs of the blocks A, B, and C.

Figure 3:
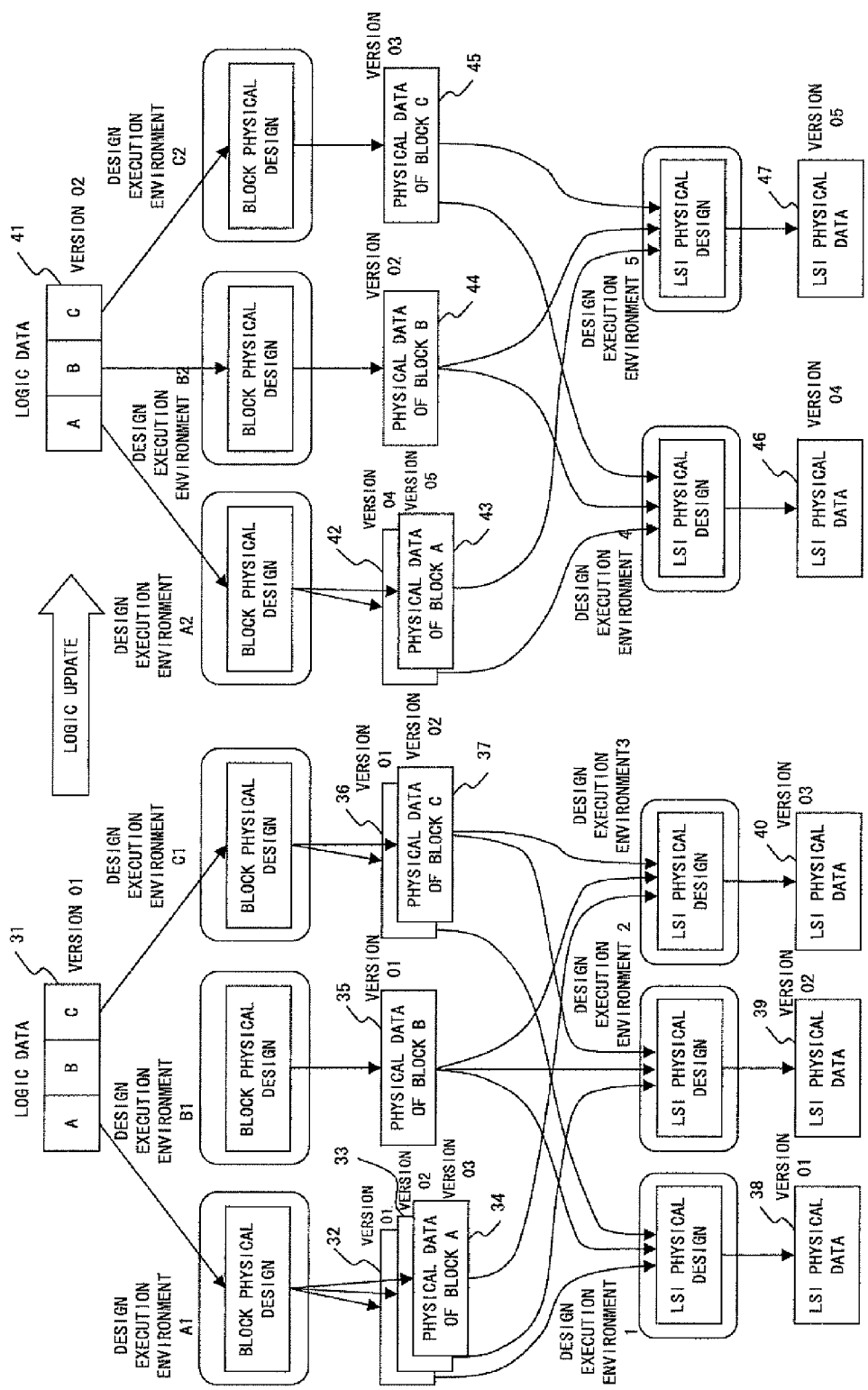
FIG. 3 exemplifies a case where an LSI physical design is made.

In FIG. 3, a design execution environment where the physical design of the block A is made by using the logic data of the version 01 is a design execution environment A1, a design execution environment where the physical design of the block B is made is a design execution environment B1, and a design execution environment where the physical design of the block C is made is a design execution environment C1.

In the design execution environment A1, the logic data of the version 01, which is the latest version of the logic data, is set as the design input data in the design data dependency information of the design execution environment, and the logic data of the version 01 is automatically input when a block physical design is made. Also in the design execution environments B1 and C1 for the blocks B and C, the logic data of the version number 01 is input when a block physical design is made.

Upon completion of the physical designs of the blocks A, B, and C, their physical data are written to the input/output data storing unit 11 as design output data. Since the design output data are the initial design output data, the version numbers at this time become 01.

Next, a design execution environment 25 (design execution environment 1) for making LSI physical verification and an LSI physical design is constructed by using the physical data of the version number 01 of the blocks A, B, and C.

In this design execution environment 1, design data dependency information 26, which indicates a dependency on the physical data of the version number 01 of each of the blocks A, B, and C, and a dependency on the logic data of the version number 01, exists.

At a stage where the design execution environment 1 is constructed, a consistency between the logic data and the physical data is verified to be maintained.

In this design execution environment 1, an LSI physical design is made, and LSI physical verification such as timing, a design tool, etc. is made by using the results of the LSI physical design. Then, data to which a correction is made depending on need based on the results of the LSI physical verification is written to the input/output data storing unit 11 as an LSI physical data version 01.

If the need for remaking, by way of example, the physical designs of the blocks A and C for the LSI physical data version 01 arises due to some reason, block physical designs are remade respectively in the design execution environments A1 and C1. Their results are then written to the input/output data storing unit 11 as the physical data of a version number 02 of the blocks A and C.

Then, a design execution environment is reconstructed for an LSI physical design using the latest physical data, so that the design execution environment 25 (design execution environment 2) is dependent on the version 02 of the block A, the version 01 of the block B, and the version 02 of the block C, which are the latest physical data of the respective blocks. By using the latest physical data, the LSI physical design, and then the LSI physical verification are made.

Also after the versions 02 of the blocks A and C are generated, the data of the version 01 of the blocks A and C remain, and the process for the LSI physical verification can be continued based on the version 01 of the blocks A, B, and C from the design execution environment 1.

Here, a case where a logic data version 02, which is newer than the logic data version 01, is generated is described with reference to the right schematic of FIG. 3.

To make the physical designs of the blocks by using the logic data version 02, design execution environments A2, B2, and C2 are respectively constructed in the design data dependency managing apparatus.

In the meantime, if a problem is found in the LSI physical verification of the design execution environment 2, and if the need for remaking the physical design of the block A arises, the process for the physical design of the block A is executed in parallel in the design execution environments A1 and A2 of the block A. Then, results of the block physical design remade in the design execution environment A1 are output as a version number 03, and results of the block physical design remade by using the logic data version 02 in the design execution environment A2 are output as a version 04.

After the two physical designs of the block A are complete, a design execution environment 3 is constructed for LSI physical verification. Although the latest version number of the physical data of the block A is 04, the version numbers of the physical data of the blocks B and C are still 01 and 02. The version 04 of the block A is generated by using the logic data version 02. However, the version 01 of the block B and the version 02 of the block C are generated by using the logic data version 01. Since their dependent version numbers of the logic data do not match, the data of the version 04 of the block A is not used, and the design execution environment 3, which is dependent on the version 03 of the block A, the version 01 of the block B, and the version 02 of the block C, is generated. Then, results of making an LSI physical design and LSI physical verification in the design execution environment 3 are stored in the input/output data storing unit 11 as a version 03 of the LSI physical data.

Additionally, if a design execution environment 25 of an LSI physical design is constructed after the results of making block physical designs in the design execution environments B2 and C2 are output as versions 02 and 03 respectively, a design execution environment 4 is generated.

This design execution environment 4 is dependent on the version 04 of the physical data of the block A, the version 02 of the physical data of the block B, and the version 03 of the physical data of the block C, and corresponds to the version 02 of the logic data. Then, LSI physical verification is made by using results of an LSI physical design made in the design execution environment 4, and data on which the results of the LSI physical verification are reflected is output to and stored in the input/output data storing unit 11 as an LSI physical data version 04.

Thereafter, if the physical data of the block A is updated and a version 05 is generated, a design execution environment 25 (design execution environment 5) of LSI physical verification corresponding to the version 05 can be constructed, and data on which the results of the LSI physical verification are reflected can be stored in the input/output data storing unit 11 as an LSI physical data version 05.

Even after the design execution environments 2 to 5 are constructed, the design of the LSI chip can be also continued by using the previously constructed design execution environment 1.

Additionally, even after the design execution environments 4 and 5 using the data that is dependent on the logic data version 02 are constructed, a new design execution environment using the data that is dependent on the logic data version 01 can be also constructed. This is enabled by allowing the design execution environment constructing unit to specify a dependency on the logic data version 01.

Furthermore, the design execution environments 1 to 5 are mutually different design execution environments 25 in this figure. However, a plurality of identical design execution environments 25 may be generated, and a plurality of persons may execute a design process in parallel.

Still further, once a design execution environment 25 is constructed, influences are not exerted even if input data is updated. Accordingly, a designer who started a design earlier does not need to be particularly conscious of, for example, synchronization with a designer who starts the design later, thereby decreasing the number of human errors, and increasing the efficiency of the design process.

Figure 4:
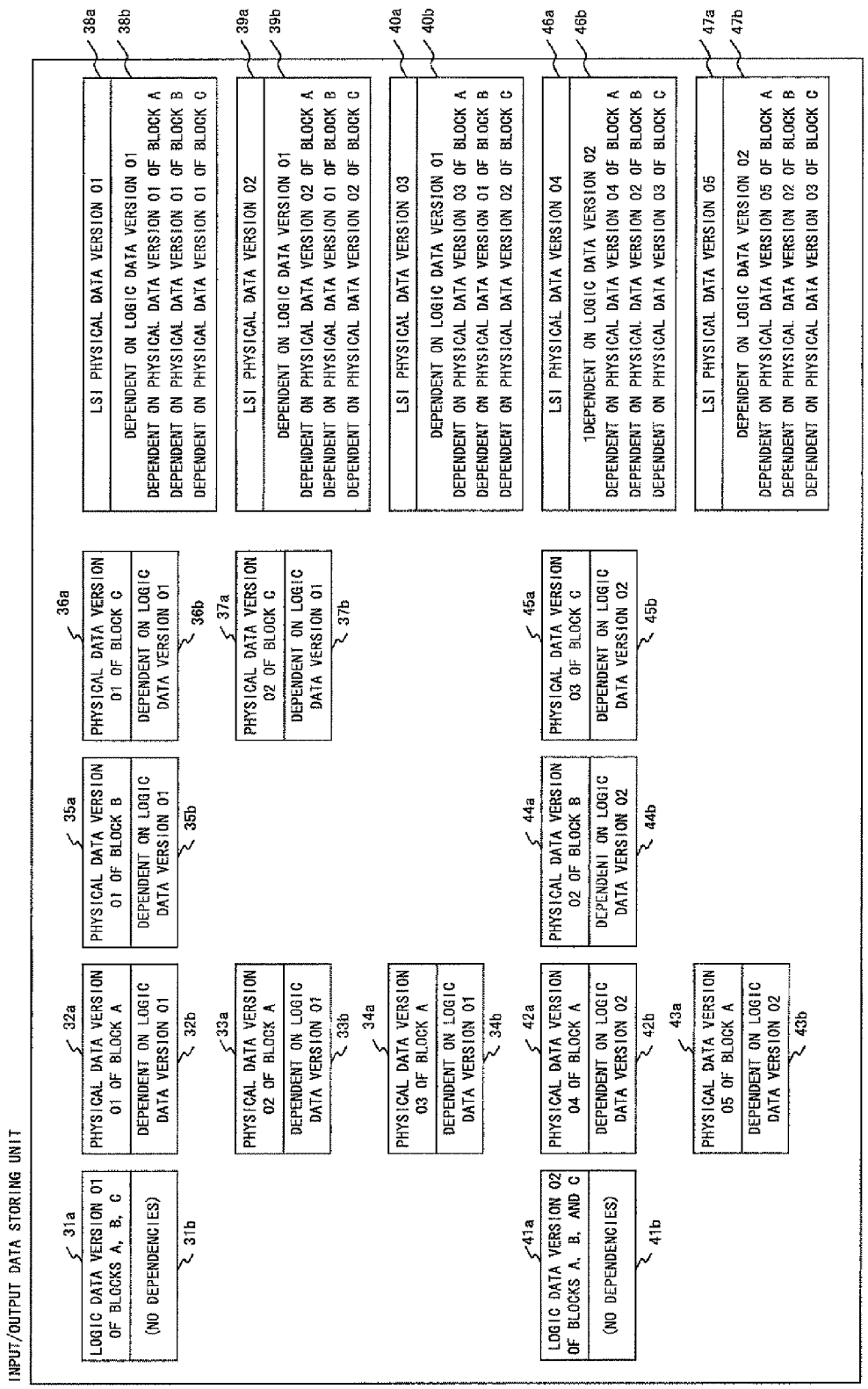
FIG. 4 shows each data shown in FIG. 3, and dependency information added thereto.

FIG. 4 shows each design input/output data of FIG. 3, and design input/output data dependency information added thereto. In this figure, reference numerals attached to the data correspond to those attached in FIG. 3.

In this preferred embodiment, the input/output data 31a to 47a are respectively associated with input/output dependency information 31b to 47b, which pair up with the input/output data 31a to 47a respectively, and stored in the input/output data storing unit.

In this figure, the data 31a to 47a are stored along with their dependency information 31b to 47b in the input/output data storing unit 11. The dependency information 31b to 47b indicate on which other data corresponding data is dependent. For example, the logic data version 01 31a has no dependencies on the other data, and accordingly, information that indicates no dependencies is stored as the dependency information 31b. Additionally, in the dependency information of the input data of the physical data version 01 of the block A 32a, and the dependency information 33b of the input data of the block physical data version 02 of the block A 33a, a dependency on the logic data version 01 is recorded.

The design input/output data are respectively stored along with the design input/output data dependency information 31b to 47b as described above, whereby the design execution environment constructing unit 12(?) can generate design data dependency information 26 that indicates data used in a design execution environment, when constructing the design execution environment. Then, the design execution environment shifting unit 13 sets an input data path to input data by referencing the design data dependency information 26, so that the input data required for a design can be referenced.

The processes are specifically described next.

A case where the physical design of the block A is made from the logic data version 01, and its results are stored as output data is initially described with reference to FIG. 5.

Firstly, the design execution environment constructing unit 12 generates design data dependency information 26 from the dependency information of the input data stored in the input/output data storing unit 11, and constructs a design execution environment 25. The construction of this design execution environment 25 is made in a way such that the design execution environment constructing unit 12 generates design data dependency information 26. In this example, the design execution environment where the physical design of the block A is made is constructed. Therefore, the design data dependency information 26 indicates the dependency on the logic data version 01.

Next, in the design data dependency managing apparatus, the design execution environment shifting unit 13 sets an input data path to the logic data version 01, which is required for the physical design of the block A, in the input/output data storing unit 11 by using the design data dependency information within the design execution environment for the physical design of the block A. Then, a designer performs block physical design operations by referencing the logic data version 01 from the input/output data storing unit 11 with the use of the input data path, and stores the physical data of the block A, which is resultant from the operations, as a version 01 in the input/output data storing unit 11. At this time, this block physical data is stored in correspondence with the dependency data indicating that this block physical data is dependent on the logic data version 01.

Similarly, the physical designs of the blocks B and C are made, and generated block physical data versions 01 are stored in the input/output data storing unit 11 along with their dependency information.

In this state, an LSI physical design for generating the LSI physical data of the entire chip (physical chip) is made to make LSI physical verification.

Figure 6:
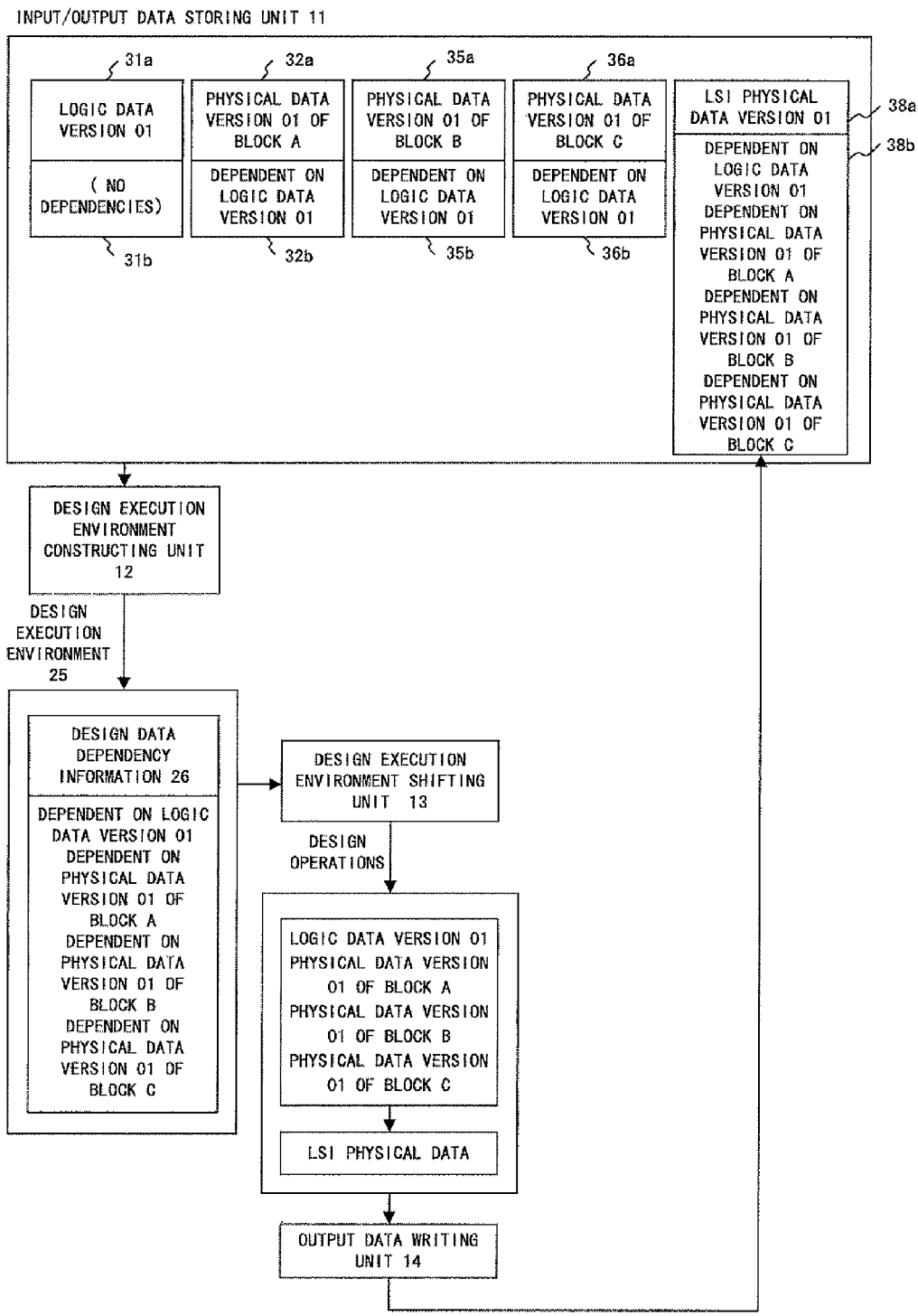
FIG. 6 shows a process executed when an LSI physical design is made.

FIG. 6 shows the process executed at this time.

In this figure, in the design data dependency managing apparatus, the design execution environment constructing unit 12 firstly generates design data dependency information 26 from the initial information, and the dependency information of the block physical data of the latest version within the input/output data storing unit 11, and constructs a design execution environment 25 (design execution environment 1). At this time, the design data dependency information 26 indicates dependencies on the logic data version 01, the physical data version 01 of the block A, the physical data version 01 of the block B, and the physical data version 01 of the block C.

Next, in the design data dependency managing apparatus, input data paths to the logic data version 01, the physical data version 01 of the block A, the physical data version 01 of the block B, and the physical data version 01 of the block C in the input/output data storing unit 11 are set based on the above described design data dependency information 26. Then, in this design execution environment 1, a designer makes the physical design of the entire chip by referencing the data with the use of the input data paths, and writes its results to the input/output data storing unit 11 as an LSI physical data version 01 by using the output data writing unit 14. Additionally, information indicating the data on which the LSI physical data version 01 is dependent (the logic data version 01, the physical data version 01 of the block A, the physical data version 01 of the block B, and the physical data version 01 of the block C) is written to the input/output data storing unit 11 as dependency information in correspondence with the LSI physical data version 01.

As described above, with the design data dependency managing apparatus according to this preferred embodiment, a user does not need to be conscious of the version numbers of data to be referenced, and he or she can make a design by using the data of consistent version numbers in a constructed design execution environment 25.

A case where a block physical design is newly made for the block A is described next.

Figure 7:
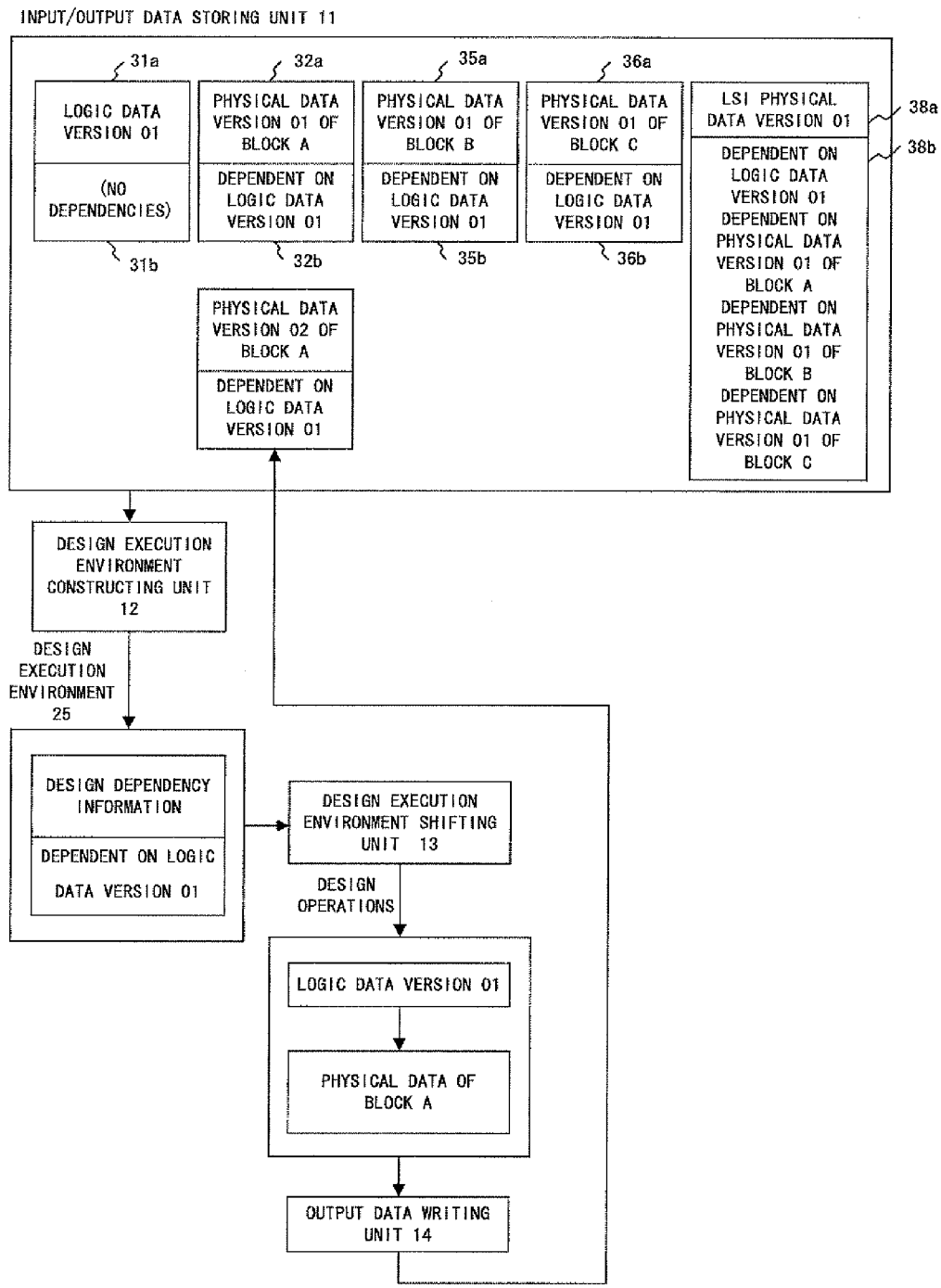
FIG. 7 shows a process executed when a physical design of the block A is newly made.

FIG. 7 shows the process executed at this time.

In this figure, similar to the process shown in FIG. 5, the design execution environment constructing unit 12 initially generates design data dependency information from initial information, and the dependency information of input data stored in the input/output data storing unit 11, and constructs a design execution environment. Next, in the design data dependency managing apparatus, the design execution environment shifting unit 13 sets an input data path to the logic data version 01, which is required for the physical design of the block A, by using the design data dependency information within the design execution environment for the physical design of the block A. Then, a designer performs block physical design operations by referencing the logic data version 01 with the use of the input data path.

Since the physical data version 01 of the block A already exists, the physical data of the block A, which is resultant from the operations, is stored as a version 02 in the input/output data storing unit 11. Additionally, at this time, this block physical data is associated with dependency information that indicates a dependency on the logic data version 01, and stored in the input/output data storing unit 11.

As described above, with the design data dependency managing apparatus according to this preferred embodiment, different version numbers of data of the same type can be automatically managed.

A case where LSI physical data is generated when the physical data version 02 of the blocks A and C, and the physical data version 01 of the block B are stored in the input/output data storing unit 11 is described next.

Figure 8:
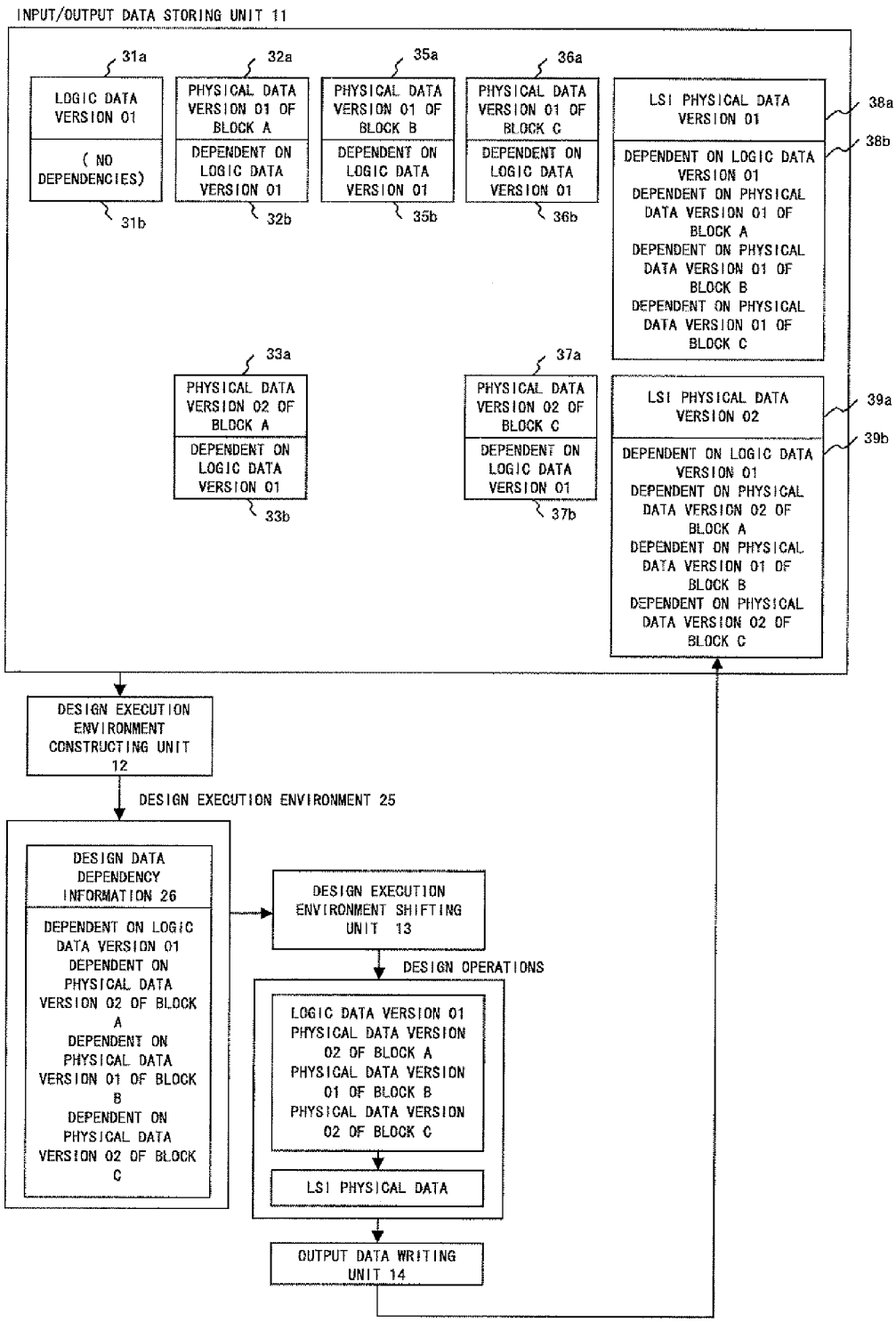
FIG. 8 shows a process executed when an LSI physical design is made in a state where the physical data of a version 02 of blocks A and C, and that of a version 01 of a block B are stored in an input/output data storing unit.

FIG. 8 shows the process executed at this time.

In this figure, in a similar manner as in the above examples, the design execution environment constructing unit 12 generates design data dependency information 26 from the initial information, and the dependency information of the latest block physical data to be targeted within the input/output data storing unit 11, and constructs a design execution environment 25 (design execution environment 2). In this example, block physical data versions 02 exist for the blocks A and C. Therefore, the latest versions of the physical data of the blocks A, B, and C are the version 02 of the block A, the version 01 of the block B, and the version 02 of the block C. Accordingly, in the design data dependency information 26, dependencies on the logic data version 01, the physical data version 02 of the block A, the physical data version 01 of the block B, and the physical data version 02 of the block C are recorded.

The design execution environment shifting unit 13 sets input data paths to the logic data version 01, the physical data version 02 of the block A, the physical data version 01 of the block B, and the physical data version 02 of the block C, on which the design execution environment is dependent, based on the design data dependency information 26. Then, a designer makes the LSI physical design of the entire chip by referencing the data with the use of the input data paths in the design execution environment 2. Next, the generated output data is to stored in the input/output data storing unit 11 as LSI physical data by using the output data writing unit 14. Since the LSI physical data version 01 already exists, the LSI physical data to be stored this time becomes a version 02. Additionally, the LSI physical data version 02 is stored in the input/output data storing unit 11 along with dependency information indicating the data on which the LSI physical data version 02 is dependent.

As described above, with the design data dependency managing apparatus according to this preferred embodiment, a designer can make a design by using data of the latest version in an automatically consistent range in a constructed design execution environment 25.

A case where LSI physical data is generated when a block physical data version 04 is generated for the block A by using the logic data version 02 is described next.

Figure 9:
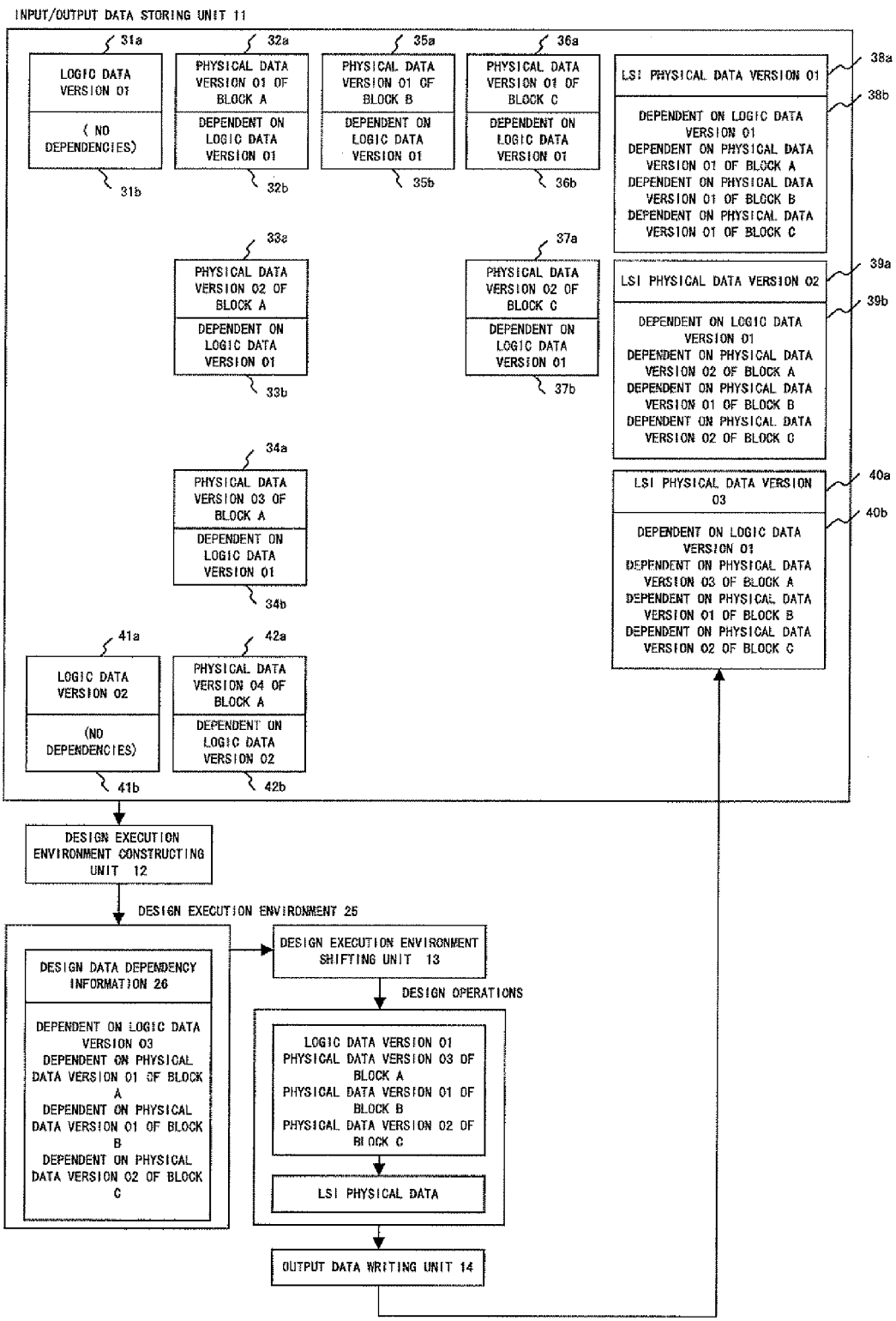
FIG. 9 shows a process executed when an LSI physical design is made in a state where a version 04 is generated for the block A by using a logic data version 02.

FIG. 9 explains the process executed at this time.

In FIG. 9, the version 04, which is the latest version of the block A, is dependent on the logic data version 02, but the physical data version 01 of the block B and the physical data version 02 of the block C, which are the latest versions of the blocks B and C, are dependent on the logic data version 01. Therefore, the design execution environment constructing unit 12 selects the version 03 as the physical data of the block A in order to unify the logic data, on which the physical data are dependent, to be the version 01.

As a result, in design data dependency information 26 of the design execution environment 25 (design execution environment 3) constructed by the design execution environment constructing unit 12, dependencies on the logic data version 01, the physical data version 03 of the block A, the physical data version 01 of the block B, and the physical data version 02 of the block C are recorded.

The design execution environment shifting unit 13 sets input data paths to the logic data version 01, the physical data version 03 of the block A, the physical data version 01 of the block B, and the physical data version 02 of the block C in the input/output storing unit 11 based on the design data dependency information 26.

In this design execution environment 3, a designer makes an LSI physical design, and writes its results to the input/output data storing unit 11 as an LSI physical data version 03 by using the output data writing unit 14 (since the versions up to 02 are already stored). Additionally, dependency information indicating the data on which the LSI physical data version 03 is dependent is associated and stored in the input/output data storing unit 11.

As described above, with the design data dependency managing apparatus according to this preferred embodiment, a designer can make an automatically consistent design in a constructed design execution environment 25 even if pluralities of pieces of logic data and physical data dependent on each piece of logic data exist.

A case where the physical data of the entire LSI chip is generated when all of pieces of physical data of the blocks A, B, and C, which are generated from the logic data version 02, exist is described next.

Figure 10:
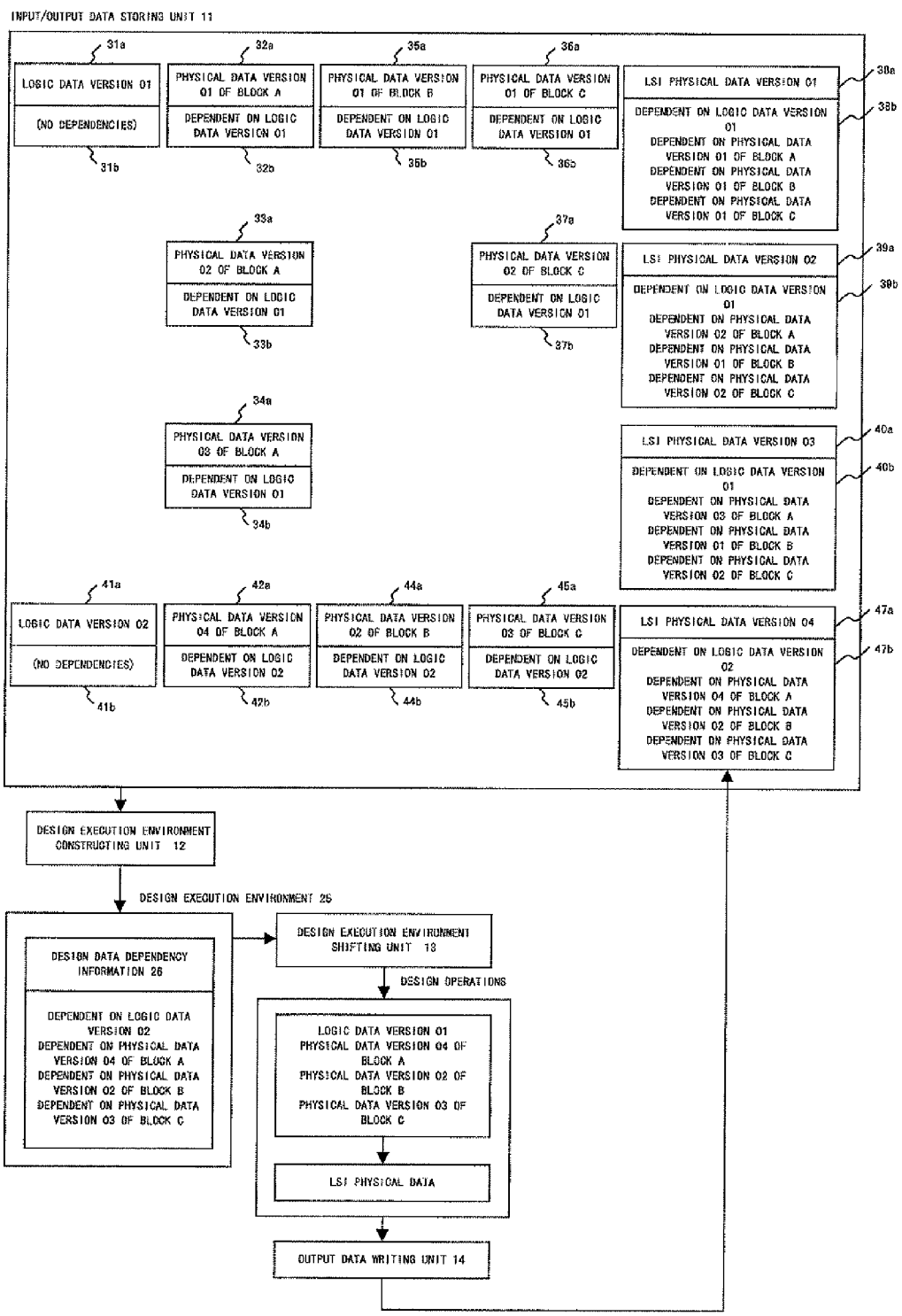
FIG. 10 shows a process executed when an LSI physical design is made in a state where all of pieces of physical data of the blocks A, B, and C, which are generated from the logic data version 02, exist.

FIG. 10 explains the process executed at this time.

In this figure, the design execution environment constructing unit 12 examines the dependency information of the latest physical data of the blocks A, B, and C within the input/output data storing unit 11. Namely, the design execution environment constructing unit 12 examines the dependency information of the version 04 of the block A, the version 02 of the block B, and the version 03 of the block C, which are the latest physical data. If all of the physical data versions are proved to be dependent on the logic data version 02, the design execution environment constructing unit 12 records, as design data dependency information 26, dependencies on the logic data version 02, the physical data version 04 of the block A, the physical data version 02 of the block B, and the physical data version 03 of the block C, and constructs a design execution environment 25 (design execution environment 4).

The design execution environment shifting unit 13 sets input data paths to the logic data version 02, the physical data version 04 of the block A, the physical data version 02 of the block B, and the physical data version 03 of the block C in the input/output data storing unit 11 based on the design data dependency information 26.

In this design execution environment 4, a designer makes the physical design of the entire LSI chip by referencing required data with the use of the input data paths, and stores its results in the input/output data storing unit 11 as an LSI physical data version 04 along with its dependency information with the use of the output data writing unit 14.

As described above, with the design data dependency managing apparatus according to this preferred embodiment, a designer can automatically make a design using the latest data in a consistent range in a constructed design execution environment 25 even if pluralities of pieces of logic dada and physical data dependent on each piece of logic data exist.

Figure 11:
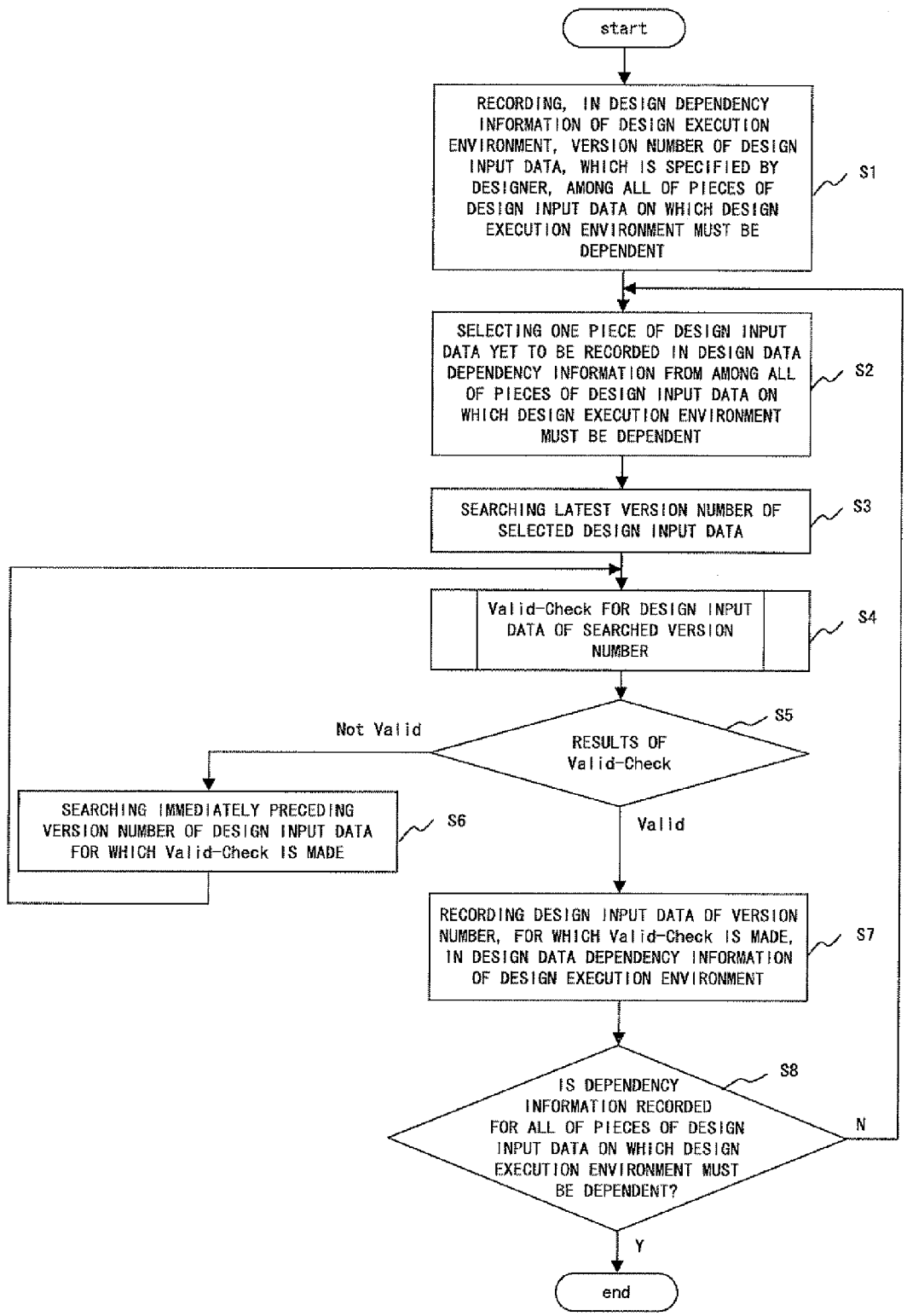
FIG. 11 is a flowchart showing the operational process of a design execution environment constructing unit.

FIG. 11 is a flowchart showing the operational process of the design execution environment constructing unit 12.

In this figure, once the design execution environment constructing unit 12 is started, the version number, which is specified by a designer, of design input data among all pieces of design input data on which a design execution environment must be dependent, is recorded in the design data dependency information 26 of the design execution environment, as step S1. This step is intended for a case where the designer desires to intentionally construct an environment which is dependent on an old version number.

Next, as step S2, the design execution environment constructing unit 12 selects one piece of design input data yet to be recorded in the design data dependency information 26 from among all of the pieces of design input data on which the design execution environment to be constructed must be dependent. Then, as step S3, the latest version number of the design input data selected in step S2 is searched.

Next, the design execution environment constructing unit 12 makes Valid-Check for the design input data of the version number searched in step S3 (or step S6 to be described later), as step S4. This Valid-Check is intended to check whether or not the design input data of that version number is valid, and its details will be described later.

If the design input data of the version number is invalid as a result of the Valid-Check made in step S4 (Not Valid in step S5), the design input data of the version number, which immediately precedes that of the design input data for which the Valid-Check is made, is searched as step S6. Then, the process goes back to step S4.

Or, if the design input data of the version number is valid as a result of the Valid-Check made in step S4 (Valid in step 35), the design input data of the version number for which the Valid-Check is made is recorded in the design data dependency information 26 of the design execution environment 25 as step 37.

Then, as step S8, whether or not dependency information is recorded in the design data dependency information 26 for all of pieces of the design input data, on which the design execution environment 25 must be dependent, is examined. If dependency information yet to be recorded is left ("N" in step S8), the process goes back to step S2. Or, if dependency information is recorded for all of pieces of the design input data ("Y" in step S8), this process is terminated.

FIG. 12 is a flowchart showing the details of the Valid-Check process executed in step S4 of FIG. 11.

In this figure, once the Valid-Check is started, whether or not the design input data of a target version number exists within the input/output data storing unit 11 is examined as step S11. If the target version exists ("Y" in step S11), the process goes to step S12. Or, if the target version does not exist ("N" in step S11), Not Valid is output, and the process goes back to step S4.

In step S12, whether or not no dependencies is set in the target design input data dependency information for which the Valid-Check is to be made is examined. If no dependencies is set ("Y" in step S12), Valid is output, and the process goes back to step S4 of FIG. 11.

If no dependencies is not set in the target design input data dependency information in step S12 ("N" in step S12), one dependency is selected from among the dependencies within the design input dependency information of the design input data of the target version number as step S13. Then, as step S14, whether or not the selected dependency is already recorded in the design data dependency information 26 of the design execution environment 25 is examined. If the selected dependency is already recorded ("Y" in step S14), whether or not the version number of the design input data of the dependency selected in step S13 and that already recorded in the design data dependency information 26 match is examined as step S15. If they do not match ("N" in step S15), Not Valid is output, and the process goes back to step S4. Or, if they match, the process goes to step S17.

Or, if the selected dependency is not recorded in the design data dependency information 26 ("N" in step S14), the process goes to step S16.

In step S16, whether or not the design input data of the version number of the selected dependency is valid is checked (Valid-Check). If the data is invalid (Not Valid in step S16), Not Valid is output, and the process goes back to step S4. Or, if the data is valid (Valid in step S16), whether or not all of dependencies in the dependency information of the design input data of the target version number are already recorded in the design data dependency information 26 in step S17. If all of the dependencies are not recorded ("N" in step S17), the process goes back to step S13, and the processes in steps S13 to S17 are repeated for all of the dependencies. Or, if all of the dependencies are recorded in the design data dependency information 26 ("Y" in step S17), Valid is output, and the process goes back to step S4.

The design execution environment constructing unit 12 can generate consistent design data dependency information 26, and can automatically construct a design execution environment 25 by executing the processes shown in FIGS. 11 and 12. Since the design data dependency managing apparatus automatically and entirely constructs a design execution environment 25 at this time, human errors do not occur.

Details of the operational process of the design execution environment shifting unit 13 are described next.

Figure 13:
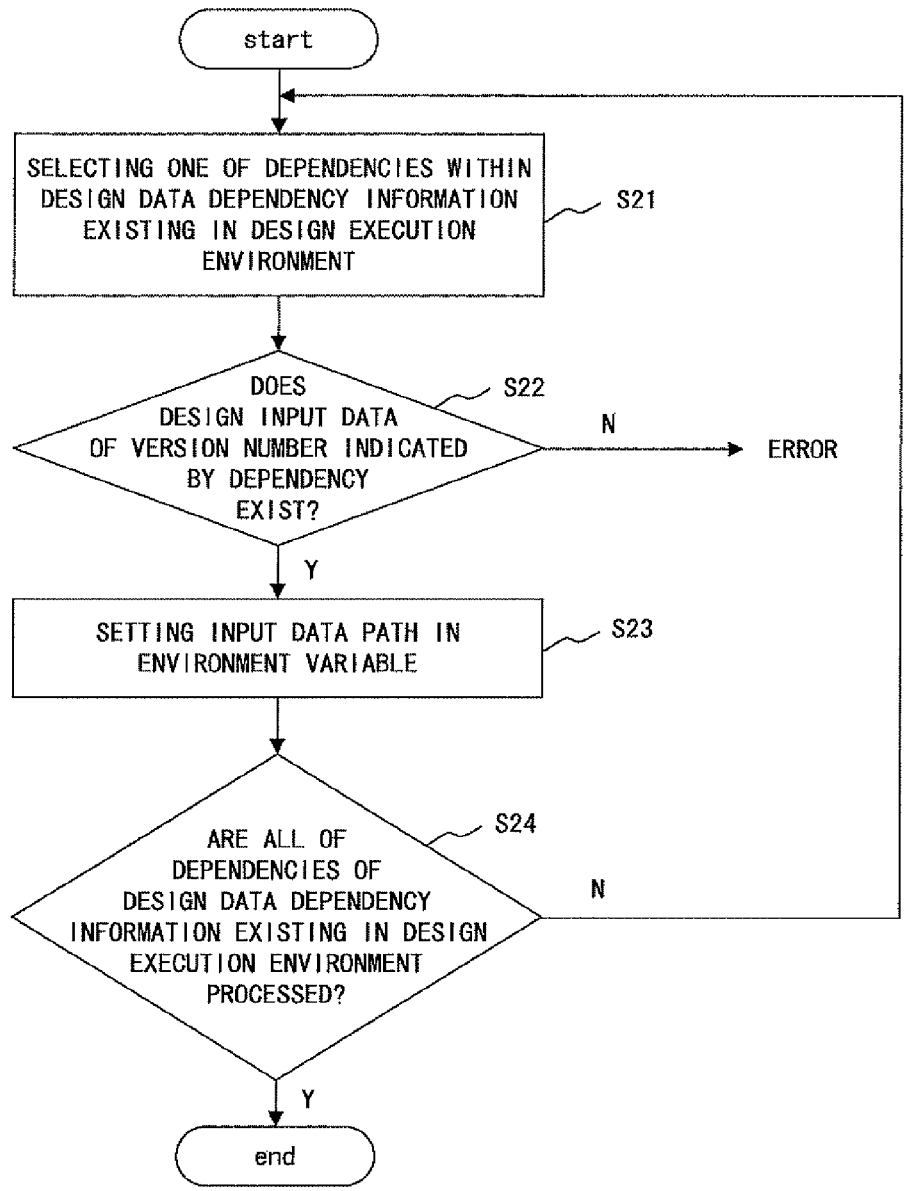
FIG. 13 is a flowchart showing the operational process of a design execution environment shifting unit.

FIG. 13 is a flowchart showing the operational process of the design execution environment shifting unit 13.

Once the process by the design execution environment shifting unit 13 is started, one dependency is initially selected from design data dependency information 26 which exists in a design execution environment 25 as step S21.

Next, whether or not the design input data of the version number indicated by the dependency selected in step S21 is stored and exists in the input/output data storing unit 11 is examined (as step S22). If the data does not exist ("N" in step S22), this process is terminated as an error.

If the design input data indicated by the dependency selected in step S21 exists in step S22 ("Y" in step S22), an input data path which indicates the position of the design input data in the input/output storing unit 11 is set as an environment variable in step S23.

Then, whether or not all of dependencies in the design data dependency information 26 of the design execution environment 25 are already processed is examined in step S24. If a dependency yet to be processed exists ("N" in step S24), the process goes back to step S21, and the processes in steps S21 to S24 are repeated. If all of the dependencies are already processed ("Y" in step S24), this process is terminated.

The design execution environment shifting unit 13 executes the process shown in FIG. 13, whereby all of input data paths of design input data, which have dependencies recorded in the design data dependency information 26, are set as environment variables. Accordingly, a designer references these environment variables when making a design in a design execution environment 25, whereby he or she can obtain an input data path to desired design input data, and can reference the data from the input/output data storing unit 11.

FIG. 14 shows the process executed when an LSI physical design is made in a state where the physical data of an LSI chip is dependent on logic data, block physical data, and a tool.

A tool 51*a* is stored in the input/output data storing unit 11 in association with dependency information 51*b*. The design execution environment constructing unit 12 generates design data dependency information 26 from the dependency information, and constructs a design execution environment 25 in a similar manner as in the above described examples.

In this figure, in the design data dependency information 26, dependencies on the logic data version 01, the physical data version 01 of the block A, the physical data version 01 of the block B, and a tool version 01 are recorded.

Additionally, the design execution environment shifting unit 13 sets input data paths to each logic data, physical data, and the tool based on the design data dependency information 26.

In such a design execution environment, a designer makes a design by referencing his or her desired logic data, physical data, and tool from the input/output data storing unit 11, and stores its results in the input/output data storing unit 11 in association with dependency information by using the output data writing unit 14.

The design data dependency managing apparatus according to this preferred embodiment can handle also a tool similar to other logic and physical data.

Figure 15:
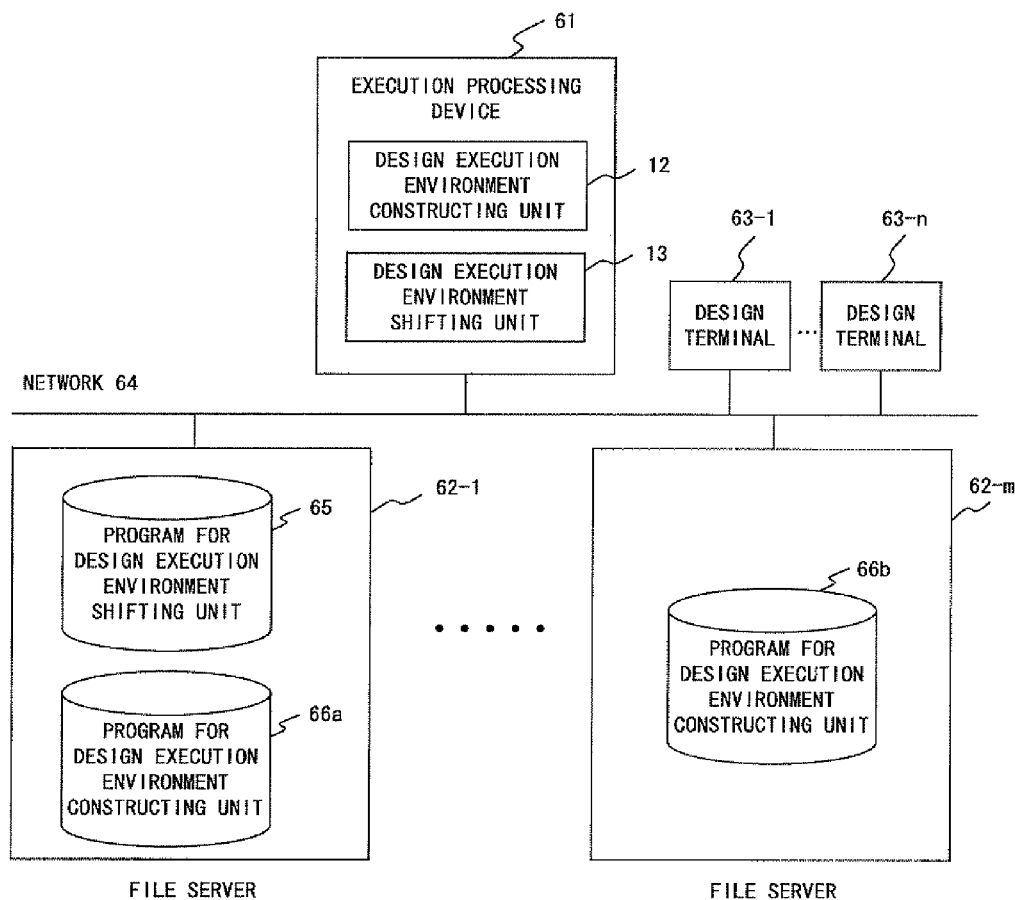
FIG. 15 shows the system configuration of the design data dependency managing apparatus according to the preferred embodiment.

FIG. 15 shows the system configuration of the design data dependency managing apparatus according to this preferred embodiment.

In this figure, this system has a configuration where an execution processing device 61, one or a plurality of file servers 62-1 to 62-*m*, and one or a plurality of design terminals 63-1 to 63-*n*, and these constituent elements are interconnected by a network 64.

The design terminals 63-1 to 63-*n* among these constituent elements are information terminals which designers actually operate to make a design.

The file servers 62-1 to 62-*m* correspond to the input/output data storing unit 11, and store a design execution environment constructing program 65 and a design execution environment shifting program 66, which implement the design execution environment constructing unit 12 and the design execution environment shifting unit 13 respectively. The execution processing device 61 reads the design execution environment constructing program 65 and the design execution environment shifting program 66 from the file servers 62-1 to 62-*m*, and executes the programs with its own CPU, whereby the design execution environment constructing unit 12 and the design execution environment shifting unit 13 are implemented.

The design execution environment constructing program 65 and the design execution environment shifting program 66 may be stored in one file server 62-1, or may be distributed and stored in the plurality of file servers 62-1 to 62-*m*. Or, these programs may be stored in a memory of the execution processing device 61.

Figure 16:
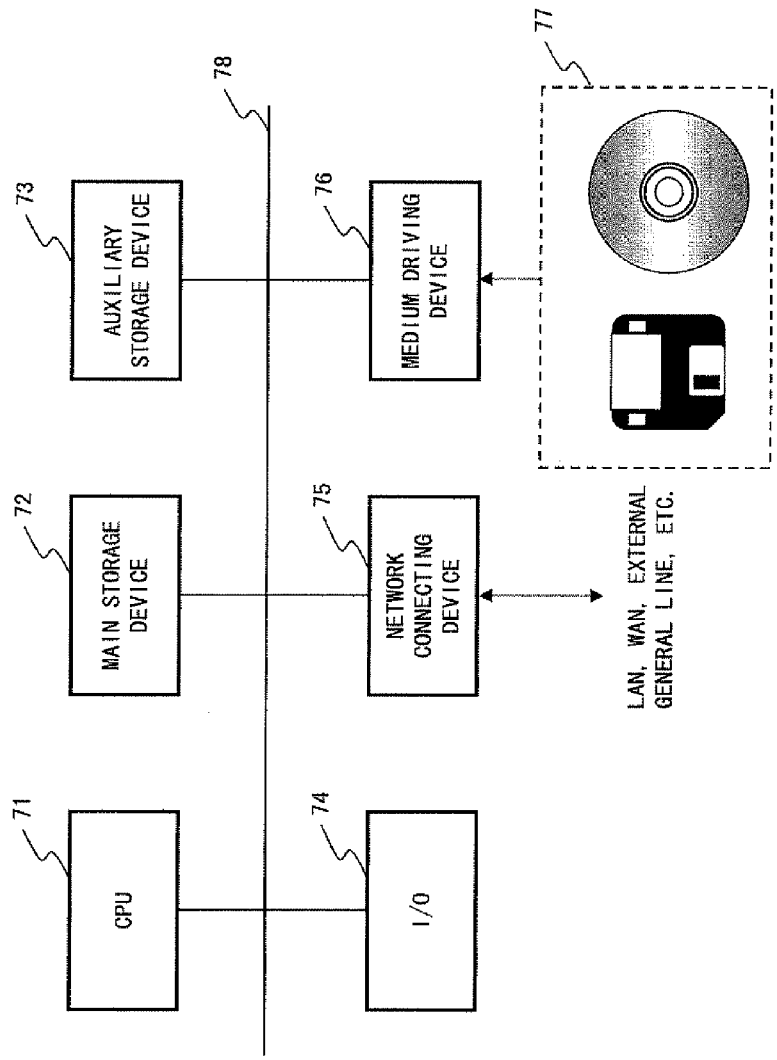
FIG. 16 is a system block diagram showing the simplified configuration of an execution processing device.

FIG. 16 is a system block diagram showing the simplified configuration of the execution processing device 61 in this preferred embodiment.

The execution processing device 61 shown in this figure has a configuration where a CPU 71, a main storage device 72 such as a RAM, etc., an auxiliary storage device 73 such as a hard disk, etc., an input/output device (I/O) 74 such as a display, a keyboard, a pointing device, etc., a network connecting device 75 such as a modem, etc., and a medium reading device 76 for reading contents stored on a portable storage medium such as a disk, a magnetic tape, etc., are comprised, and these constituent elements are interconnected by a bus 78. These constituent elements mutually exchange data via the bus 78.

The CPU 71 implements the processes represented by the flowcharts shown in FIGS. 10, 11, and 13 by executing a program stored in the auxiliary storage device 73 or a program installed via the network connecting device 75 with the use of the main storage device 72 as a working memory.

The execution processing device 61 shown in FIG. 16 reads a program and data, which are stored on a storage medium 77 such as a magnetic tape, a flexible disk, a CD-ROM, an MO, etc., by using the medium reading device 76, and loads the program and the data into the main storage device 72 or the auxiliary storage device 73. The CPU 71 executes and uses the program and the data, whereby the above described processes represented by the flowcharts shown in FIGS. 2 and 3 are implemented in a software manner.

Additionally, in the information execution processing device shown in FIG. 16, application software is sometimes replaced by using the storage medium 77 such as a flexible disk, etc. Accordingly, the present invention is not limited to a design data dependency managing apparatus and managing method, and can be configured as the computer-readable storage medium 77 for causing a computer to execute the functions of the above described preferred embodiment according to the present invention when used by the computer.

Figure 17:
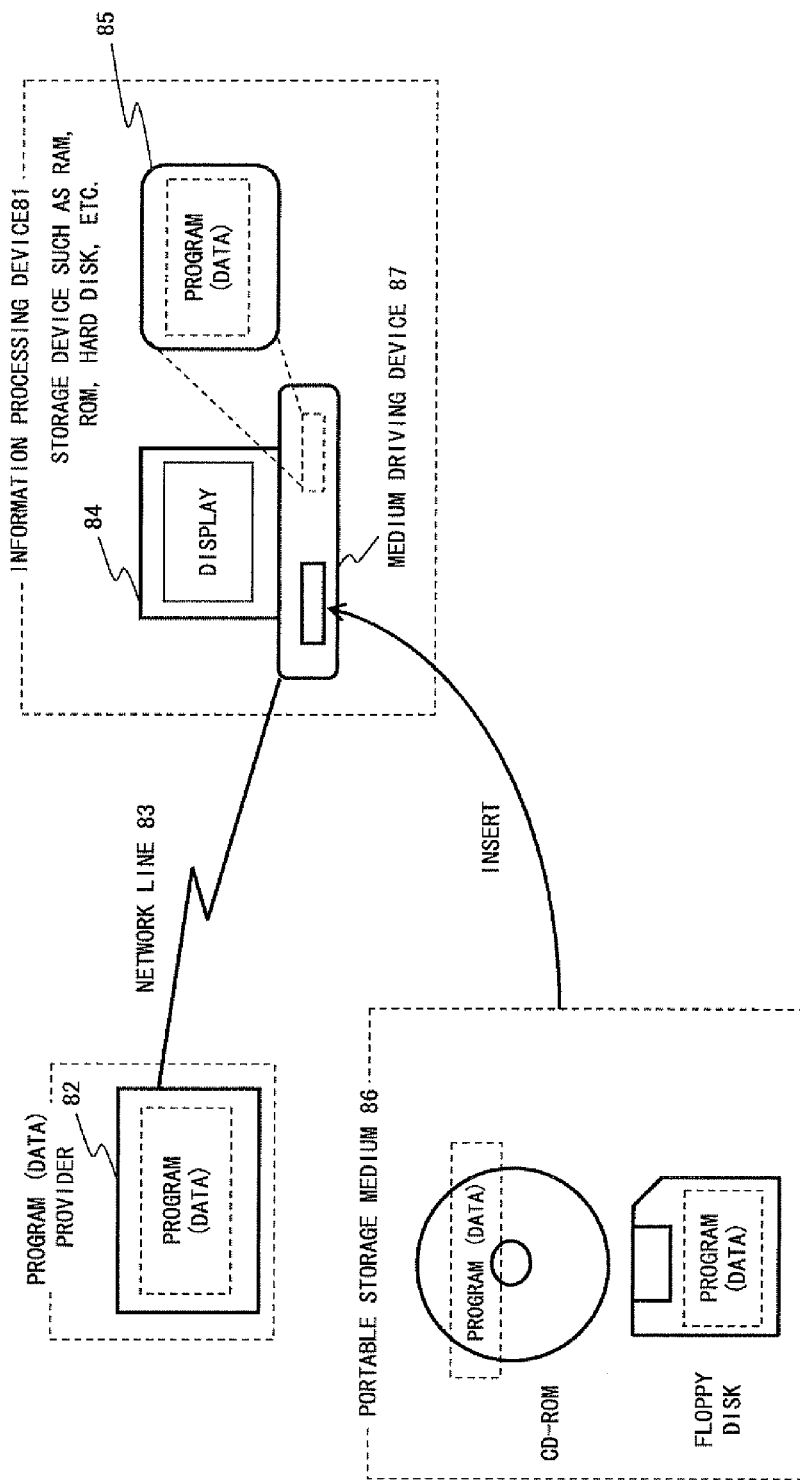
FIG. 17 exemplifies storage media.

In this case, the storage medium includes, for example, as shown in FIG. 17, a portable storage medium 86 such as a CD-ROM, a flexible disk (or an MO, a DVD, a removable hard disk, etc.), which is insertable/removable into/from a medium driving device 87, a storing unit (database, etc.) 82 within an external device (server, etc.) the program and the data of which are transmitted via a network line 83, or a memory (RAM, a hard disk, etc.) 85 within the main body 84 of an information processing device 81. The program stored on the portable storage medium 86 or in the storing unit (database, etc.) 82 is loaded into the memory (RAM, a hard disk, etc.) 85 within the main body 84, and executed.

Additionally, the present invention can be also implemented by using, as the above stated storage medium such as a CD-ROM, a DVD-ROM, etc., a variety of large-capacity storage media to be developed in the future, such as a next-generation optical disc storage medium using blue laser, for example, a Blu-ray Disc (registered trademark), an AOD (Advanced Optical Disc), etc., an HD-DVD9 using red laser, a Blue Laser DVD using blue-purple laser, etc. in addition to the storage media cited earlier as examples.

What is claimed is:

1. A design data dependency managing apparatus, comprising:
 a design component data storing unit to store design component data which is data of a component included in a circuit to be designed, the design component data including logic data of the circuit, physical data of layout and wiring in the circuit, a version number of the logic data, a version number of the physical data, design input and output dependency information that indicates dependencies between the version number of the logic data and the version number of the physical data, the physical data being generated by using the logic data;
 a design execution environment constructing unit to acquire logic data and physical data for which the version number of the logic data and the version number of the physical data are dependent from one another by referencing to the design input and output dependency information, to generate design data dependency information that indicates using the acquired logic data and physical data, and to construct a design execution environment where a designer makes a design;

a design execution environment shifting unit to set an input data path in the design execution environment, the input data path indicating positions of the logic data and the physical data to be used in the design on the design component data storing unit by reference to the generated design data dependency information; and an output data writing unit to store dependency information, which is generated using the design data dependency information in the design execution environment in which the input data path is set, in an input and output data storing unit in correspondence with results of the design made by the designer.

2. The design data dependency managing apparatus according to claim 1, wherein the design execution environment shifting unit checks whether the design component data of the version number, to which the input data path is to be set, is stored in the design component data storing unit before setting the input data path.

3. The design data dependency managing apparatus according to claim 2, wherein the design component data includes a timing cell library and a physical cell library.

4. The design data dependency managing apparatus according to claim 1, wherein the design execution environment constructing unit adds continuously constant design execution environment information to the dependency information, and said design execution environment shifting unit enables a design in a continuously fixed environment by referencing the dependency information, to which the design execution environment information is added.

5. The design data dependency managing apparatus according to claim 4, wherein the design parts component includes a timing cell library and a physical cell library.

6. The design data dependency managing apparatus according to claim 1 wherein the design component data required for the design is referenced by using the input data path in the design execution environment.

7. The design data dependency managing apparatus according to claim 6, wherein the design component data includes a timing cell library and a physical cell library.

8. The design data dependency managing apparatus according to claim 1, wherein the design execution environment constructing unit records, as a dependency, latest version numbers of all of pieces of the design component data, which are required when a design process is executed, in the dependency information in a range where the dependency is consistent.

9. The design data dependency managing apparatus according to claim 8, wherein the design execution environment constructing unit examines a dependency of the design component data of a version number older than the latest version number, when consistency is not maintained with the design component data of the latest version number, and records, as a dependency, the latest version numbers of all of pieces of the design component data, which are required when the design process is executed, in the dependency information in a range where the dependency is consistent.

10. The design data dependency managing apparatus according to claim 9, wherein the design component data includes a timing cell library and a physical cell library.

11. The design data dependency managing apparatus according to claim 8, wherein the design component data includes a timing cell library and a physical cell library.

12. The design data dependency managing apparatus according to claim 1, wherein the design execution environment constructing unit generates the dependency information so that a dependency is made on design component data of a particular version number specified by a designer, and also generates dependency information of a latest version number as the dependency information in a range where a dependency is consistent in all of pieces of the design component data, which include the design component data of the version number specified by the designer, for the design component data other than the specified version.

13. The design data dependency managing apparatus according to claim 12, wherein the design component data includes a timing cell library and a physical cell library.

14. The design data dependency managing apparatus according to claim 1, wherein the design execution environment holds the dependency information.

15. The design data dependency managing apparatus according to claim 14, wherein the design component data includes a timing cell library and a physical cell library.

16. The design data dependency managing apparatus according to claim 1, wherein the design execution environment constructing unit checks whether the design component data of a version number, a dependency of which is recorded in the dependency information, is stored in the design component data storing unit, when generating the dependency information.

17. The design data dependency managing apparatus according to claim 16, wherein the design component data includes a timing cell library and a physical cell library.

18. The design data dependency managing apparatus according to claim 1, wherein the design component data includes a tool.

19. The design data dependency managing apparatus according to claim 18, wherein the design component data includes a timing cell library, and a physical cell library.

20. The design data dependency managing apparatus according to claim 1, wherein the design component data includes a timing cell library and a physical cell library.

21. A design data dependency managing method comprising:

storing, by using a computer, design component data which is data of a component included in a circuit to be designed, the design component data including logic data of the circuit, physical data of layout and wiring in the circuit, a version number of the logic data, a version number of the physical data, design input and output dependency information that indicates dependencies between the version number of the logic data and the version number of the physical data, the physical data being generated by using the logic data;

acquiring, by using the computer, logic data and physical data for which the version number of the logic data and the version number of the physical data are dependent from one another by referencing to the design input and output dependency information;

generating, by using the computer, design data dependency information that indicates using the acquired logic data and physical data, and constructing a design execution environment where a designer makes a design;

setting, by using the computer, an input data path in the design execution environment, the input data path indicating positions of the logic data and the physical data to be used in the design on the design component data storing unit by reference to the generated design data dependency information; and storing, by using the computer, dependency information, which is generated using the design data dependency information in the design execution environment in which the input data path is set, in an input and output data storing unit in correspondence with results of the design made by the designer.

22. A computer-readable storage medium storing a program for causing an information processing device to execute a process, the process comprising:

storing design component data which is data of a component included in a circuit to be designed, the design component data including logic data of the circuit, physical data of layout and wiring in the circuit, a version number of the logic data, a version number of the physical data, design input and output dependency information that indicates dependencies between the version number of the logic data and the version number of the physical data, the physical data being generated by using the logic data;

acquiring logic data and physical data for which the version number of the logic data and the version number of the physical data are dependent from one another by referencing to the design input and output dependency information;

generating design data dependency information that indicates using the acquired logic data and physical data, and constructing a design execution environment where a designer makes a design;

setting an input data path in the design execution environment, the input data path indicating a positions of the logic data and the physical data to be used in the design on the design component data storing unit by reference to the generated design data dependency information; and storing dependency information, which is generated using the design data dependency information in the design execution environment in which the input data path is set, in an input and output data storing unit in correspondence with results of the design made by the designer.

* * * * *